US012704814B2

(12) United States Patent
Carreno et al.

(10) Patent No.: US 12,704,814 B2
(45) Date of Patent: Aug. 11, 2026

(54) MOVEMENT TRANSMISSION SYSTEM

(71) Applicant: ROLEX SA, Geneva (CH)

(72) Inventors: William Carreno, Geneva (CH); Vincent Lemosquet, Geneva (CH); Denis Rudaz, Segny (FR)

(73) Assignee: ROLEX SA, Geneva (CH)

( * ) Notice: Subject to any disclaimer, the term of this patent is extended or adjusted under 35 U.S.C. 154(b) by 764 days.

(21) Appl. No.: 17/994,152

(22) Filed: Nov. 25, 2022

(65) Prior Publication Data

US 2023/0168632 A1 Jun. 1, 2023

(30) Foreign Application Priority Data

Nov. 30, 2021 (EP) .................................... 21211477

(51) Int. Cl.
*G04B 19/253* (2006.01)

(52) U.S. Cl.
CPC ................................ *G04B 19/2536* (2013.01)

(58) Field of Classification Search
CPC .. G04B 19/24; G04B 19/253; G04B 19/2536; G04B 19/25353
See application file for complete search history.

(56) References Cited

U.S. PATENT DOCUMENTS 3,716,983 A 2/1973 Tanaka
3,789,602 A 2/1974 Nemoto
(Continued)

FOREIGN PATENT DOCUMENTS

CH 680630 A3 10/1992
CH 710109 A2 3/2016
(Continued)

OTHER PUBLICATIONS

European Search Report dated May 6, 2022 in priority application No. EP21211477; with English machine translation (total 18 pages).
(Continued)

*Primary Examiner* — Edwin A. Leon
*Assistant Examiner* — Jason M Collins
(74) *Attorney, Agent, or Firm* — Seckel IP, PLLC

(57) ABSTRACT

The movement transmission system (90), notably for a timepiece calendar system (200), includes a driving includes a driving mobile (4) pivoted about a first axis (A4) and has a driving toothset (42) distributed over a curved profile (43); a driven mobile (7) pivoted about a second axis (A7) and having a driven toothset (72); an intermediate pinion (8) pivoted about a third axis (A8) and having a toothset (81) driven by the driving toothset (42) and driving the driven toothset (72): the toothset (42), the curved profile (43), the driven toothset (72) and the toothset (81) being arranged at a same level or in a same plane, and the driving mobile (4), the driven mobile (7) and the intermediate pinion (8) being arranged so that the driving mobile (4) moves the driven mobile (7) via the intermediate pinion (8) through 1/m steps for at least some steps of the driving mobile (4), m being a real number greater than 1, and so that the driving mobile (4) can define an angular position, with minimum play, of the driven mobile (7) via the pinion (8), whereas the driving mobile (4) is in a given angular position.

21 Claims, 14 Drawing Sheets

(56) References Cited

U.S. PATENT DOCUMENTS

| | | | | |
|---|---|---|---|---|
| 3,939,645 | A | 2/1976 | Charbonney | |
| 8,830,797 | B2 | 9/2014 | Dubugnon et al. | |
| 10,437,198 | B2 | 10/2019 | La China et al. | |
| 11,347,186 | B2 * | 5/2022 | Rudaz | G04B 19/2536 |
| 2011/0286311 | A1 | 11/2011 | Ono | |
| 2012/0127835 | A1 * | 5/2012 | Dubugnon | G04B 19/25353 368/37 |
| 2016/0202664 | A1 * | 7/2016 | Carreno | G04B 19/25306 368/37 |
| 2017/0153604 | A1 | 6/2017 | La China et al. | |
| 2019/0129362 | A1 | 5/2019 | Fleury et al. | |
| 2019/0179264 | A1 | 6/2019 | Calame et al. | |
| 2019/0346813 | A1 | 11/2019 | Rudaz | |
| 2023/0168630 | A1 * | 6/2023 | Fleury | G04B 19/2538 368/28 |
| 2023/0168631 | A1 * | 6/2023 | Fleury | G04B 19/2536 368/28 |

FOREIGN PATENT DOCUMENTS

| | | | |
|---|---|---|---|
| EP | 0987609 | A1 | 3/2000 |
| EP | 2624075 | A1 | 8/2013 |
| EP | 2843483 | A1 | 3/2015 |
| EP | 3173877 | A1 | 5/2017 |
| EP | 3483663 | A1 | 5/2019 |
| EP | 3499317 | A1 | 6/2019 |
| EP | 3567438 | A1 | 11/2019 |
| FR | 2240474 | A1 | 3/1975 |

OTHER PUBLICATIONS

Office Action dated Feb. 14, 2025 in co-pending U.S. Appl. No. 17/994,145; with PTO892; without returned SB08 (total 19 pages).

Office Action dated Feb. 18, 2025 in co-pending U.S. Appl. No. 17/994,148; with PTO892; without returned SB08 (total 16 pages).

European Search Report dated Apr. 26, 2022 in priority application No. EP21211469 of co-pending U.S. Appl. No. 17/994,145; with English machine translation (total 16 pages).

European Search Report dated Apr. 26, 2022 in pnonty application No. EP21211473 of co-pending U.S. Appl. No. 17/994,148; with English machine translation (total 17 pages).

* cited by examiner

MOVEMENT TRANSMISSION SYSTEM

This application claims priority of European patent application No. EP21211477.1 filed Nov. 30, 2021, the content of which is hereby incorporated by reference herein in its entirety.

BACKGROUND ART

The invention relates to a timepiece calendar system. The invention also relates to a timepiece movement comprising such a timepiece calendar system. The invention further relates to a timepiece comprising such a timepiece movement or such a timepiece calendar system. The invention still further relates to a method for operating such a timepiece calendar system or such a timepiece movement or such a timepiece. The invention lastly relates to a transmission system with which such a timepiece calendar system or such a timepiece movement or such a timepiece can be equipped.

Document EP3567438 describes an embodiment of a calendar system, notably an annual calendar system, comprising a drive device provided with a single and unique drive mobile. This drive mobile comprises a first finger provided to actuate one of the thirty-one teeth of a date disc in order to enable a first jump of said date disc and thus make it possible to change the date irrespective of the day of the month, and also an additional finger, angularly offset with respect to the first finger, provided to actuate a tooth of a finger mounted so as to be able to move on the date disc in order to enable a supplementary jump of said date disc at the end of a month having thirty days or fewer. Advantageously, the drive device comprises a calendar cam and an elastic lever. The interaction of the cam and the lever enables an instantaneous rotation of the drive mobile, thereby making it possible to instantaneously change the date irrespective of the number of jumps performed by the date disc.

Document CH680630 likewise discloses a drive device provided with a single and unique drive mobile, notably within a perpetual calendar system. This solution is hardly compatible with the implementation of an instantaneous-jump drive device. This is because the displacement performed by the drive mobile to enable the multiple jumps of the date wheel when a hypothetical elastic lever is being unwound should be maximized. The winding of the elastic lever, which should likewise be maximized, would thus be performed over a limited displacement of the drive mobile, this leading to abrupt variations in torque that are liable to cause resulting drops in amplitude at the oscillator, notably at a balance mobile-hairspring oscillator.

It is thus necessary to define an instantaneous-jump drive device suitable for implementing notably a semi-perpetual or perpetual calendar, which makes it possible to reduce the energy losses at the oscillator as far as possible, whilst still being compact.

Document EP0987609 describes a first drive mobile provided with an axis of rotation which is fixed relative to a frame, and a second drive mobile provided with an axis of rotation which is displaceable relative to the same frame, but the drive finger of the second mobile is provided to drive a tooth fixed to a date disc. In this design, the second mobile is mounted on a lever that can be displaced relative to the frame counter to a return spring generating a superfluous consumption of energy, which is hardly compatible with the implementation of an instantaneous-jump drive device.

Document CH710109 describes a calendar system comprising a first drive mobile provided with an axis of rotation which is fixed relative to a frame, and a second drive mobile provided with an axis of rotation which is fixed relative to the same frame, but the drive finger of the second mobile is provided to drive an additional tooth fixed to a date wheel. In order to implement the calendar system according to document CH710109, the finger of the second mobile is mounted so as to be displaceable counter to a month-programming cam disposed coaxially with the second mobile, under the effect of a return spring. On the one hand, this return spring leads to a superfluous consumption of energy and causes torque fluctuations throughout a day, this being hardly compatible with the implementation of an instantaneous-jump drive device. On the other hand, the month-programming cam is particularly bulky, this leaving very little area available for the installation of a calendar cam and an elastic lever within the drive device. Furthermore, the installation of a month-programming cam disposed coaxially with the second mobile at least partially dictates the positioning of the axis of the second mobile relative to the frame, this possibly being a limiting factor for optimizing the drive of the date wheel under the action of the drive finger of the second mobile. Lastly, every day this finger performs a complete rotation around the month-programming cam, this possibly leading to premature wear of the drive device, all the more so if the second finger is elastically returned against the cam under the effect of a return spring.

SUMMARY OF THE INVENTION

The aim of the invention is to provide a timepiece calendar system that improves the known systems of the prior art and to solve the problems mentioned. In particular, the invention proposes a simple and compact timepiece calendar system which performs well and is moreover compatible with an annual, semi-perpetual or perpetual calendar system.

According to a first aspect of the invention, subjects are defined by the following propositions.

1. Timepiece calendar system (200), the system comprising:
   - a date mobile (4) which is displaceable step by step relative to a frame (199);
   - a first drive finger (21) for driving the date mobile (4);
   - a first tooth (51) for driving the date mobile (4), the first tooth (51) being mounted on the date mobile (4) so as to be displaceable between a deactivated, or retracted, position and an activated, or drive, position;
   - an activation system (6, 7) for activating the first tooth (51); the first drive finger (21) and the first tooth (51) being arranged such that a single action of the first drive finger (21) on the first tooth (51) can displace the date mobile (4) through N steps, N being an integer such that N>1, notably N=2 or N=3.

2. Timepiece calendar system (200) according to the preceding proposition, wherein the activation system (6, 7) is arranged such that the single action of the first drive finger (21) on the first tooth (51) displaces the date mobile (4) through n steps, with n being an integer of any value between 1 and N, depending on the moment at which the first tooth (51) is activated by the activation system (6, 7).

3. Timepiece calendar system (200) according to either of the preceding propositions, wherein the activation system (6, 7) is a desmodromic system (6, 7) comprising a month cam (7) and a cam follower (6), the desmodromic system being arranged such that at least a first position of the month cam (7) defines a first position of the follower (6) allowing the retraction of the first tooth (51), and that at least a second position of the month cam (7) defines a second position of the follower (6) preventing the retraction of the first tooth (51).

4. Timepiece calendar system (200) according to the preceding proposition, wherein the month cam (7) and the date mobile (4) are coaxial.

5. Timepiece calendar system (200) according to one of the preceding propositions, wherein it comprises a second drive finger (11) for driving the date mobile (4), notably a second drive finger (11) arranged so as to interact with a toothset (41) of the date mobile (4), in particular a toothset (41) having 31 teeth.

6. Timepiece calendar system (200) according to the preceding proposition, wherein the first drive finger (21) forms part of a first drive mobile (2), and wherein the second drive finger (11) forms part of a second drive mobile (1), the first drive mobile (2) and the second drive mobile (1) comprising, preferably respectively, a first axis (A2) of rotation and a second axis (A1) of rotation which are separate.

7. Timepiece calendar system (200) according to the preceding proposition, wherein the first drive mobile (2) and the second drive mobile (1) are kinematically connected to one another by a third drive mobile (3).

8. Timepiece calendar system (200) according to one of the preceding propositions, wherein it comprises an instantaneous drive device (92, 96, 97), notably an instantaneous drive device (92, 96, 97) comprising a spring-lever (97) and a calendar cam (96), in particular a calendar cam (96) arranged at the third drive mobile (3).

9. Timepiece calendar system (200) according to one of the preceding propositions, wherein the system comprises a device (98) for holding the date mobile (4) in position and a device (93) for minimizing or cancelling the holding torque for holding the date mobile (4) in position, notably a device (93) comprising a cam (95) arranged at the second drive mobile (1).

10. Timepiece calendar system (200) according to one of the preceding propositions, wherein the first drive mobile (2) comprises a third finger (23) for driving a day mobile.

11. Timepiece calendar system (200) according to one of the preceding propositions, wherein the system comprises a kinematic connection element (8) arranged such that the date mobile (4) moves a month cam (7) forming part of the activation system (6, 7) of the first tooth (51) through 1/m steps for at least some steps of the date mobile (4), with m being a real number greater than 1 and preferably between 2 and 20.

12. Timepiece calendar system (200) according to one of the preceding propositions, wherein the system comprises a kinematic connection element (8) arranged such that the date mobile (4) moves a month cam (7) forming part of the activation system (6, 7) such that the month cam (7) is displaced each month before or during the jump from the day of the month “27” to the day of the month “28”, for example during the jump from the day of the month “26” to the day of the month “27”.

13. Timepiece movement (300) comprising a system (200) according to one of the preceding propositions.

14. Timepiece movement (400), in particular wristwatch, comprising a system (200) according to one of propositions 1 to 12 and/or a timepiece movement (300) according to proposition 13.

15. Method for operating a timepiece calendar system according to one of propositions 1 to 12 or a timepiece movement according to proposition 13 or a timepiece according to proposition 14, the method comprising the following steps:

activating the first tooth (51), a single action of the first drive finger (21) on the first tooth (51) being able to displace the date mobile (4) through an amplitude of at most N steps, N being an integer such that N>1, notably N=2 or N=3.

16. Operating method according to the preceding proposition, wherein the single action of the first drive finger (21) on the first tooth (51) displaces the date mobile (4) through n steps, with n being an integer of any value between 1 and N, depending on the moment at which the first tooth (51) is activated by the activation system (6, 7).

17. Operating method according to proposition 15 or 16, wherein, when the first tooth (51) is activated, the first finger (21) subjects the first tooth (51) to a mechanical action for driving the date mobile (4), and/or wherein, when the first tooth is deactivated, the first finger (21) subjects the first tooth (51) to a mechanical action for retracting the first tooth (51) without driving the date mobile (4).

According to a second aspect of the invention, subjects are defined by the following propositions.

18. Timepiece calendar system (200), the system comprising:

a date mobile (4) which is displaceable step by step relative to a frame (199);

a first drive finger (21) for driving the date mobile (4);

a first tooth (51) for driving the date mobile (4), the first tooth (51) being mounted on the date mobile (4) so as to be displaceable between a deactivated, or retracted, position and an activated, or drive, position;

an activation system (6, 7) for activating the first tooth (51); the first drive finger (21) and the first tooth (51) being arranged such that a single action of the first drive finger (21) on the first tooth (51) displaces the date mobile (4) through n steps, with n being an integer of any value between 1 and N, N being an integer such that N>1, notably N=2 or N=3, depending on the moment at which the first tooth (51) is activated by the activation system (6, 7).

19. Timepiece calendar system (200) according to proposition 18, wherein the activation system (6, 7) is a desmodromic system (6, 7) comprising a month cam (7) and a cam follower (6), the desmodromic system being arranged such that at least a first position of the month cam (7) defines a first position of the follower (6) allowing the retraction of the first tooth (51), and that at least a second position of the month cam (7) defines a second position of the follower (6) preventing the retraction of the first tooth (51).

20. Timepiece calendar system (200) according to proposition 19, wherein the month cam (7) and the date mobile (4) are coaxial.

21. Timepiece calendar system (200) according to one of propositions 18 to 20, wherein it comprises a second drive finger (11) for driving the date mobile (4), notably a second drive finger (11) arranged so as to interact with a toothset (41) of the date mobile (4), in particular a toothset (41) having 31 teeth.

22. Timepiece calendar system (200) according to proposition 21, wherein the first drive finger (21) forms part of a first drive mobile (2), and wherein the second drive finger (11) forms part of a second drive mobile (1), the first drive mobile (2) and the second drive mobile (1) comprising, preferably respectively, a first axis (A2) of rotation and a second axis (A1) of rotation which are separate.

23. Timepiece calendar system (200) according to proposition 22, wherein the first axis (A2) is disposed on a first circle centred on the axis (A4) of the date mobile (4) and is at a first radius (R2), and wherein the second axis (A1) is disposed on a second circle centred on an axis (A4) of the date mobile (4) and is at a second radius (R1), the first radius (R2) preferably being less than the second radius (R1) or 0.9 times less than the second radius (R1) or 0.8 times less than the second radius (R1), the toothset (41) of the date mobile (4) preferably being an inner toothset and the first tooth (51) being oriented inwards.

24. Timepiece calendar system (200) according to proposition 23, wherein the first drive mobile (2) and the second drive mobile (1) are kinematically connected to one another by a third drive mobile (3).

25. Timepiece calendar system (200) according to one of propositions 22 to 24, wherein the first drive finger (21) has a first head radius (RT2) and the second drive finger (11) has a second head radius (RT1), the first and second head radii being different, notably the first head radius (RT2) being greater than the second head radius (RT1), in particular the first head radius (RT2) being 1.5 times greater than the second head radius (RT1) or the first head radius (RT2) being 1.8 times greater than the second head radius (RT1).

26. Timepiece calendar system (200) according to one of propositions 18 to 25, wherein it comprises an instantaneous drive device (92, 96, 97), notably an instantaneous drive device (92, 96, 97) comprising a spring-lever (97) and a calendar cam (96), in particular a calendar cam (96) arranged at the third drive mobile (3).

27. Timepiece calendar system (200) according to one of propositions 18 to 26, wherein the system comprises a device (98) for holding the date mobile (4) in position and a device (93) for minimizing or cancelling the holding torque for holding the date mobile (4) in position, notably a device (93) comprising a cam (95) arranged at the second drive mobile (1).

28. Timepiece calendar system (200) according to one of propositions 18 to 27, wherein the first drive mobile (2) comprises a third finger (23) for driving a day mobile.

29. Timepiece movement (300) comprising a system (200) according to one of propositions 18 to 28.

30. Timepiece (400), in particular wristwatch, comprising a system (200) according to one of propositions 18 to 28 and/or a timepiece movement (300) according to proposition 29.

31. Method for operating a timepiece calendar system according to one of propositions 18 to 28 or a timepiece movement according to proposition 29 or a timepiece according to proposition 30, the method comprising the following steps:

- activating the first tooth (51),
- a single action of the first drive finger (21) on the first tooth (51) causing a displacement of the date mobile (4) through n steps, with n being an integer of any value between 1 and N, N being an integer such that N>1, notably N=2 or N=3, depending on the moment at which the first tooth (51) is activated by the activation system (6, 7).

32. Operating method according to the preceding proposition, wherein, when the first tooth (51) is activated, the first finger (21) subjects the first tooth (51) to a mechanical action for driving the date mobile (4), and/or wherein, when the first tooth is deactivated, the first finger (21) subjects the first tooth (51) to a mechanical action for retracting the first tooth (51) without driving the date mobile (4).

According to a third aspect of the invention, subjects are defined by the following propositions.

33. Movement transmission system (90), notably movement transmission system for a timepiece calendar system (200), the transmission system comprising:

- a driving mobile (4) which is pivoted about a first axis (A4) and comprises a driving toothset (42) distributed over a curved profile (43), in particular a circular profile (43),
- a driven mobile (7) which is pivoted about a second axis (A7) and comprises a driven toothset (72),
- an intermediate pinion (8) which is pivoted about a third axis (A8) and comprises a toothset (81) driven by the driving toothset (42) and driving the driven toothset (72), the driving toothset (42), the curved profile (43), the driven toothset (72) and the toothset (81) being arranged at one and the same level or in one and the same plane, the driving mobile (4), the driven mobile (7) and the intermediate pinion (8) being arranged such that the driving mobile (4) moves the driven mobile (7) via the intermediate pinion (8) through 1/m steps for at least some steps of the driving mobile (4), with m being a real number greater than 1 and preferably between 2 and 20, and being arranged such that the driving mobile (4) can define an angular position, with minimum play, of the driven mobile (7) via the pinion (8), whereas the driving mobile (4) is in a given angular position, in particular via the curved profile (43).

34. Transmission system (90) according to proposition 33, wherein the curved profile (43) is centred on the first axis (A4) and at least partially defines the outer contour of the driving mobile (4).

35. Transmission system (90) according to either of propositions 33 and 34, wherein the intermediate pinion (8) comprises asymmetric teeth.

36. Transmission system (90) according to one of propositions 33 to 35, wherein the intermediate pinion (8) comprises four or five pairs of teeth.

37. Transmission system (90) according to proposition 36, wherein the teeth of one pair of teeth are configured symmetrically in relation to one another relative to a plane (P81) passing through the third axis (A8) of the intermediate pinion (8).

38. Transmission system (90) according to one of propositions 33 to 37, wherein the driving toothset (42) comprises one or more teeth (42*i*) surrounded by two first cutouts (42*j*, 42*k*) and distributed over the curved profile (43).

39. Transmission system (90) according to one of propositions 33 to 38, wherein the driven toothset (72) comprises teeth (72*i*), each of which is surrounded by two second cutouts (72*j*, 72*k*).

40. Transmission system (90) according to propositions 38 and 39, wherein the driving mobile (4), the driven mobile (7) and the intermediate pinion (8) are arranged such that:

- the one or more teeth (42*i*) of the driving toothset (42) interact exclusively with the internal flanks (812*i*) of pairs of teeth of the pinion (8), and
- the external flanks (813*i*) of pairs of teeth of the pinion (8) interact with the flanks of the second cutouts (72*j*, 72*k*) of the driven toothset (72), and
- the curved profile (43) interacts exclusively with the external flanks (813*i*).

41. Transmission system (90) according to one of propositions 33 to 40, wherein:

- the driven mobile (7) surrounds the driving mobile (4), or
- the driving mobile (4) surrounds the driven mobile (7).

42. Transmission system (90) according to one of propositions 33 to 41, wherein:

the driven mobile (7) is a month mobile, notably a month cam and/or a month-displaying mobile, or the driving mobile (4) is a date mobile.

43. Transmission system (90) according to the preceding proposition, wherein the driving mobile (4), the driven mobile (7) and the intermediate pinion (8) are arranged such that the driven mobile (7) is driven before the day of the month "28", preferably when the day of the month "26" is changing to the day of the month "27" and/or when the day of the month "27" is changing to the day of the month "28".

44. Transmission system (90) according to proposition 42 or 43, wherein the driven mobile (7) is a month cam arranged so as to control the activation of a first tooth (51) for driving the driving mobile, constituting a date mobile (4), the first tooth (51) being mounted on the date mobile (4) so as to be displaceable between a deactivated, or retracted, position and an activated, or drive position.

45. Timepiece calendar system (200) comprising a transmission system (90) according to one of propositions 33 to 44.

46. Timepiece movement (300) comprising a transmission system (90) according to one of propositions 33 to 44 and/or a calendar system (200) according to the preceding proposition.

47. Timepiece (400), in particular wristwatch, comprising a transmission system (90) according to one of propositions 33 to 44 and/or a calendar system according to proposition 45 and/or a timepiece movement (300) according to proposition 46.

Provided that it is not logically or technically incompatible, any combination of the features mentioned under these various aspects is conceivable.

BRIEF DESCRIPTION OF THE DRAWINGS

The appended drawings show, by way of example, one embodiment of a timepiece.

DETAILED DESCRIPTION OF PARTICULAR EMBODIMENTS

Figure 1:
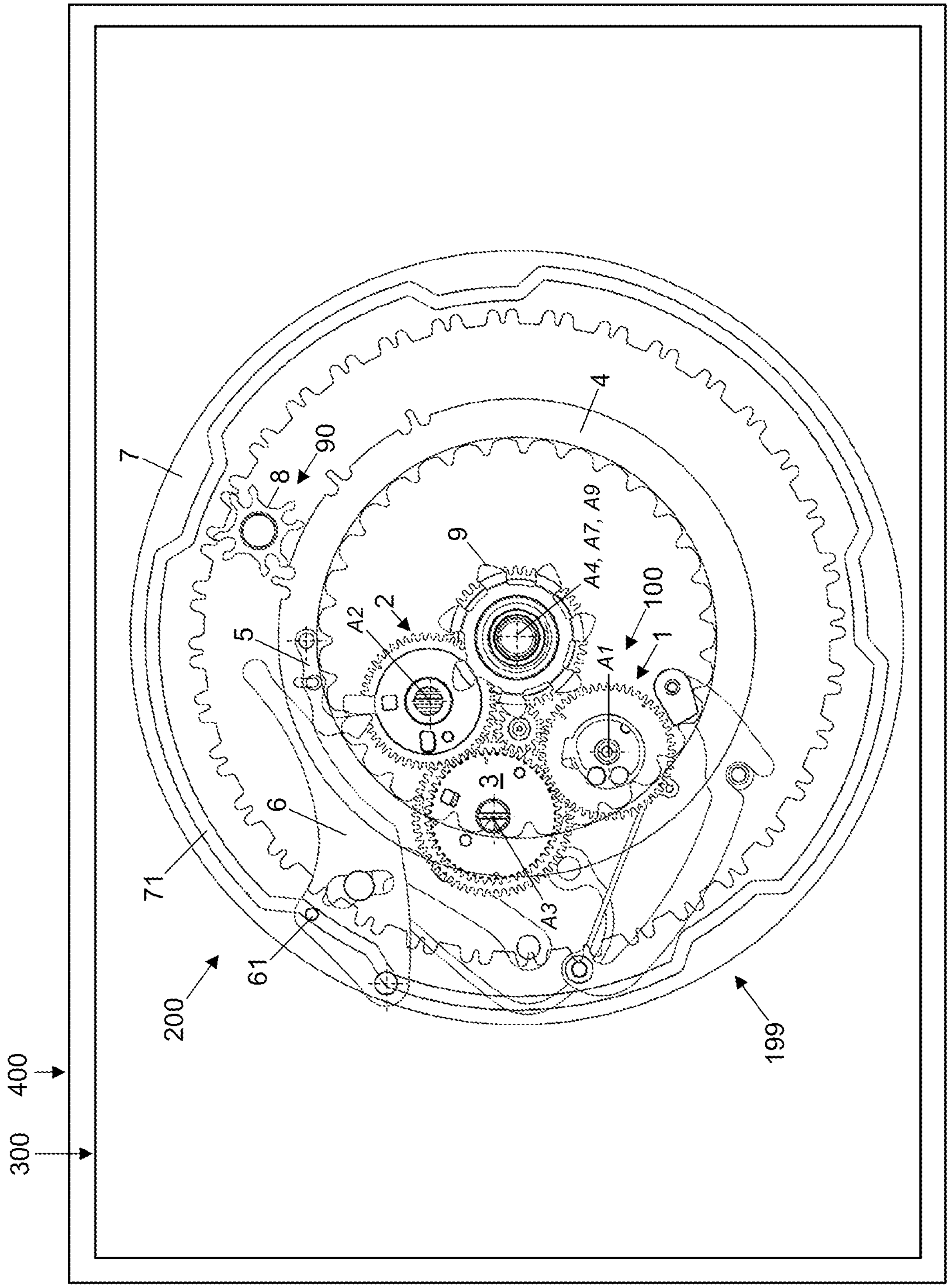
FIG. 1 is a schematic view of one embodiment of a timepiece.

One embodiment of a timepiece 400 is described below in detail with reference to FIGS. 1 to 21. The timepiece 400 is for example a watch, in particular a wristwatch. The timepiece 400 comprises a timepiece movement 300 intended to be mounted in a timepiece casing or case in order to protect it from the external environment. The timepiece movement 300 may be a mechanical movement, notably an automatic movement, or a hybrid movement. As an alternative, the movement 300 may be an electronic or electromechanical movement.

The timepiece movement 300 comprises a calendar system 200. Notably, the calendar system 200 may be a calendar module added to the rest of the movement. The movement and/or the calendar module comprises a frame 199 comprising for example one or more plates and possibly bridges.

In the embodiment described, the calendar system is semi-perpetual and displays an indication of the dates, the days and the months. As an alternative, the calendar may be of any other type, notably annual or perpetual. The calendar system may display any other set of indications.

The timepiece calendar system 200 comprises:

a date mobile 4 which is displaceable step by step relative to the frame 199, and a drive device 100.

The drive device 100 comprises:

a drive finger 21 for driving the date mobile 4;

a tooth 51 for driving the date mobile 4, the first tooth 51 being mounted on the date mobile 4 so as to be displaceable between a deactivated, or retracted, position and an activated, or drive, position; and an activation system 6, 7 for activating the tooth 51.

The date mobile 4, which may in particular comprise a date disc 4, is preferentially centred on the calendar system 200 or on the movement 300 along an axis A4. The date mobile 4 comprises a toothset 41 provided with 31 teeth, and a finger 5 mounted on said mobile 4 so as to be able to move, in particular mounted on said mobile 4 so as to be able to pivot about an axis of rotation A5. The finger 5 comprises the tooth 51 at one of its ends, in particular at a longitudinal end opposite the end at which the axis of rotation A5 is located. In a first configuration of the calendar system, notably in a first configuration of the activation system 6, 7 that can be referred to as deactivated configuration, the tooth 51 is movable relative to the mobile 4. In a second configuration of the calendar system, notably in a second configuration of the activation system 6, 7 that can be referred to as activated configuration, the tooth 51 is prevented from moving relative to the mobile 4.

Preferentially, the toothset 41 takes the form of an inner toothset, and the tooth 51 is oriented inwards. In other words, the teeth of the toothset 41 and the tooth 51 are preferentially oriented towards the axis A4.

Figure 6:
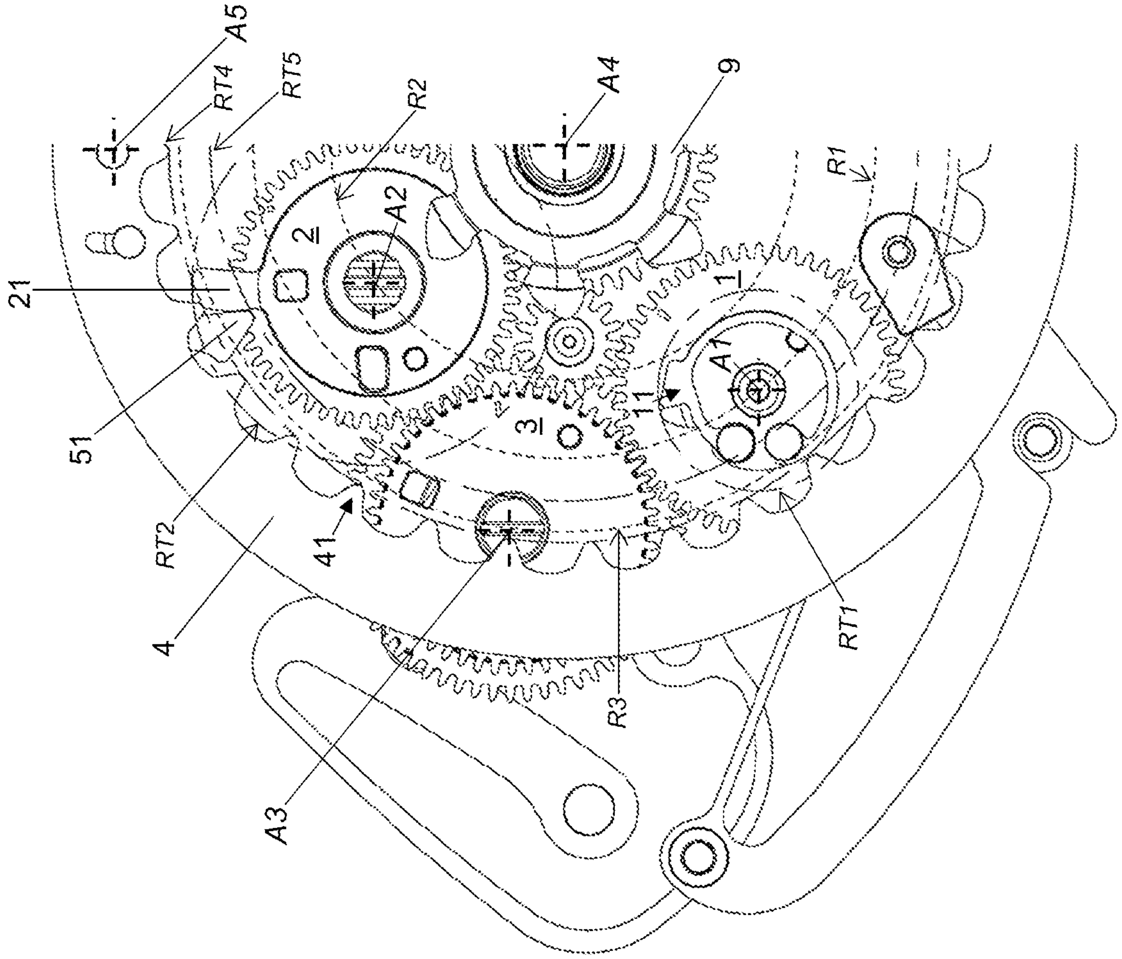

Advantageously, the head radius RT5 (defined from the axis A4) of the tooth 51 is different from the head radius RT4 (defined from the axis A4) of the teeth of the toothset 41 when the tooth 51 is prevented from moving relative to the mobile 4, in particular prevented from moving about the axis A5, as illustrated in FIG. 6. Preferentially, the head radius RT5 is less than the head radius RT4, or even less than 0.9×RT4, when the tooth 51 is prevented from moving relative to the mobile 4, in particular prevented from moving about the axis A5. In other words, the tooth 51 projects or is able to project beyond the toothset 41. Such a configuration of the tooth 51 makes it possible to maximize the lead of the mobile 4 when the latter is driven by the interaction between the tooth 51 and the drive device 100. More particularly, such a configuration of the tooth 51 makes it possible to potentially actuate the mobile 4 through multiple steps when the latter is driven by the interaction between the tooth 51 and the drive device 100.

The finger 5 is able to interact with a follower 6, in particular a lever 6 mounted on the frame 199 of the calendar system 200 or of the movement 300 so as to be able to pivot about an axis A6. To that end, the finger 5 comprises a contact surface 52 provided to interact, by making contact, with a flank 62 of the follower 6. The follower 6 also comprises a peg or a pin 61 which is intended to be housed in a groove 71 in a month cam 7, in this case taking an annular shape.

The flanks 71*a*, 71*b* of the groove 71 of the cam 7 each act as cam profiles 71*a*, 71*b*, which are provided to control the position of the follower 6, notably the angular position of the follower 6 about the axis A6, via the pin 61 independently of any return spring.

The follower 6 and the cam 7 thus form part of the activation system 6, 7 for activating the finger 5 or the tooth 51. The follower 6 and the cam 7 preferably define a desmodromic system 6, 7 arranged so as to:

- allow the finger 5 or the tooth 51 to move about the axis A5 in at least one position of the mobile 4, and
- prevent the finger 5 or the tooth 51 from moving about the axis A5 in at least one position of the mobile 4, notably in at least one position of the mobile 4 corresponding to the above-mentioned position of the mobile 4.

More particularly, at least one first position of the cam 7 defines a first position of the follower 6 allowing the finger 5 or the tooth 51 to move about the axis A5 in at least one position of the mobile 4. More particularly, at least one second position of the cam 7 defines a second position of the follower 6 preventing the finger 5 or the tooth 51 from moving about the axis A5 in at least one position of the mobile 4. In this latter configuration, the tooth 51 projects beyond the toothset 41 in the embodiment described.

The implementation of the activation system 6, 7 makes it possible to regulate the programming of an annual, semi-perpetual or perpetual cycle, as will be described below.

The cam 7 is preferentially centred on the calendar system 200 or on the movement 300 along an axis A7. The axes A4 and A7 therefore preferentially coincide. In other words, the mobile 4 and the cam 7 are disposed preferably coaxially. The mobile 4 and the cam 7 are advantageously connected by a transmission system, which will be described in detail below. Preferentially, the cam 7 comprises a toothset 72 able to be driven periodically by teeth of a toothset 42 of the mobile 4, via a pinion 8 pivoted about an axis A8, as will be described below.

Preferentially, the toothset 42 takes the form of an outer toothset, and the toothset 72 takes the form of an inner toothset.

The calendar system 200 moreover comprises a day starwheel 9, which is preferentially centred on the calendar system 200 or on the movement 300 along an axis A9. The axes A4, A7 and A9 therefore preferentially coincide. In other words, the elements 4, 7 and 9 are disposed preferably coaxially. In particular, the day starwheel 9 comprises a toothset 91 provided with seven teeth.

Figure 2:
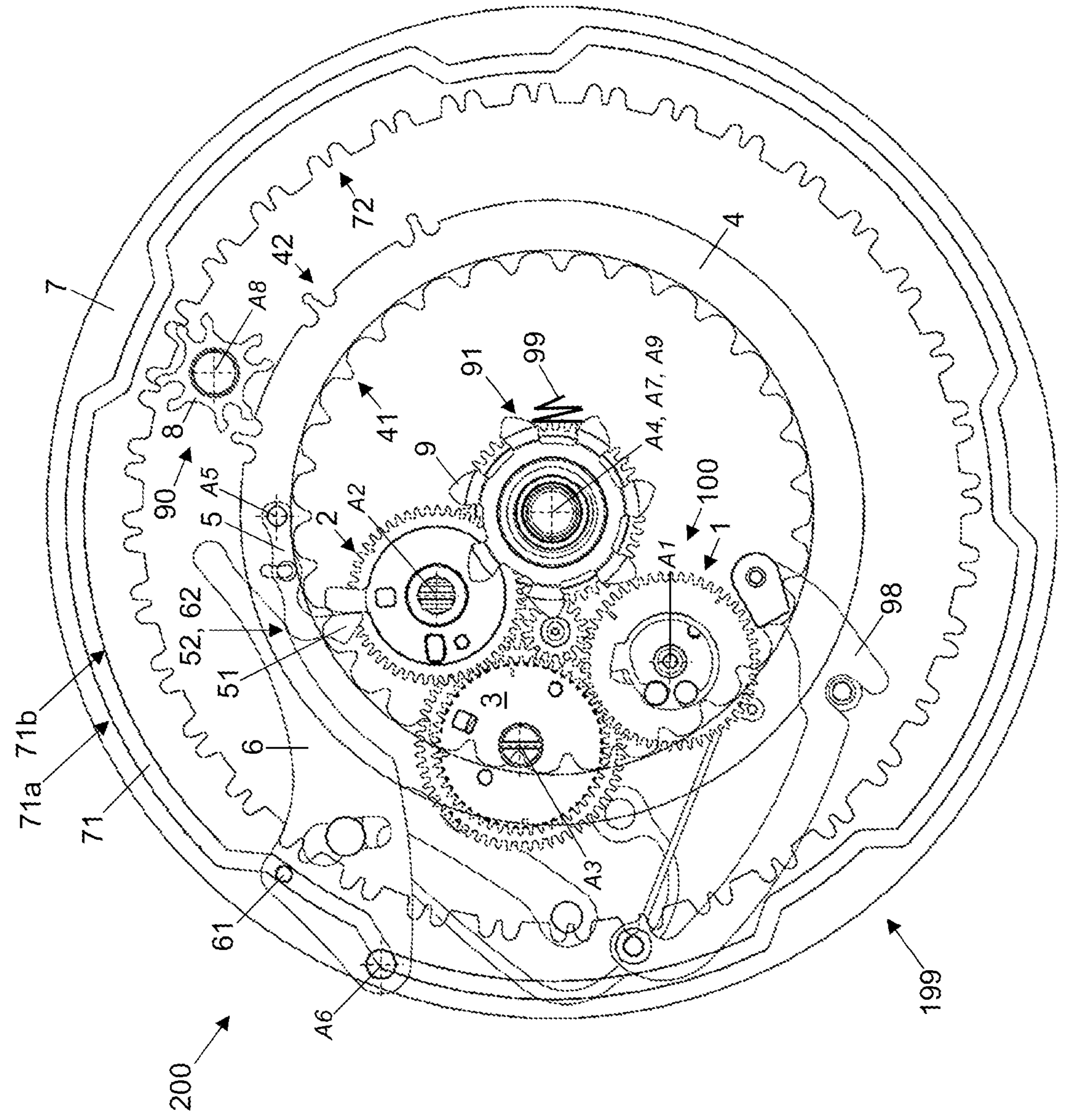
FIGS. 2 and 6 are views of one embodiment of a calendar system with which the timepiece is equipped.

The mobile 4 and the starwheel 9 are angularly indexed in position relative to the frame 199 via jumpers 98 and 99, respectively (the latter being shown schematically in FIG. 2). For its part, the cam 7 is angularly indexed relative to the frame 199 by the mobile 4, via the pinion 8. More particularly, this pinion 8 is specifically configured so as to enable the cam 7 to be angularly locked with minimum play when the latter is not driven by one of the teeth of the toothset 42 of the mobile 4, as will be described below.

The mobile 4 and the starwheel 9 are configured and/or arranged so as to be able to be driven periodically, in particular every 24 hours, by the drive device 100. The cam 7 is configured and/or arranged so as to be able to be driven periodically, at the end and possibly at the start of each month, by the drive device 100 via the mobile 4 and the pinion 8.

Figure 3:
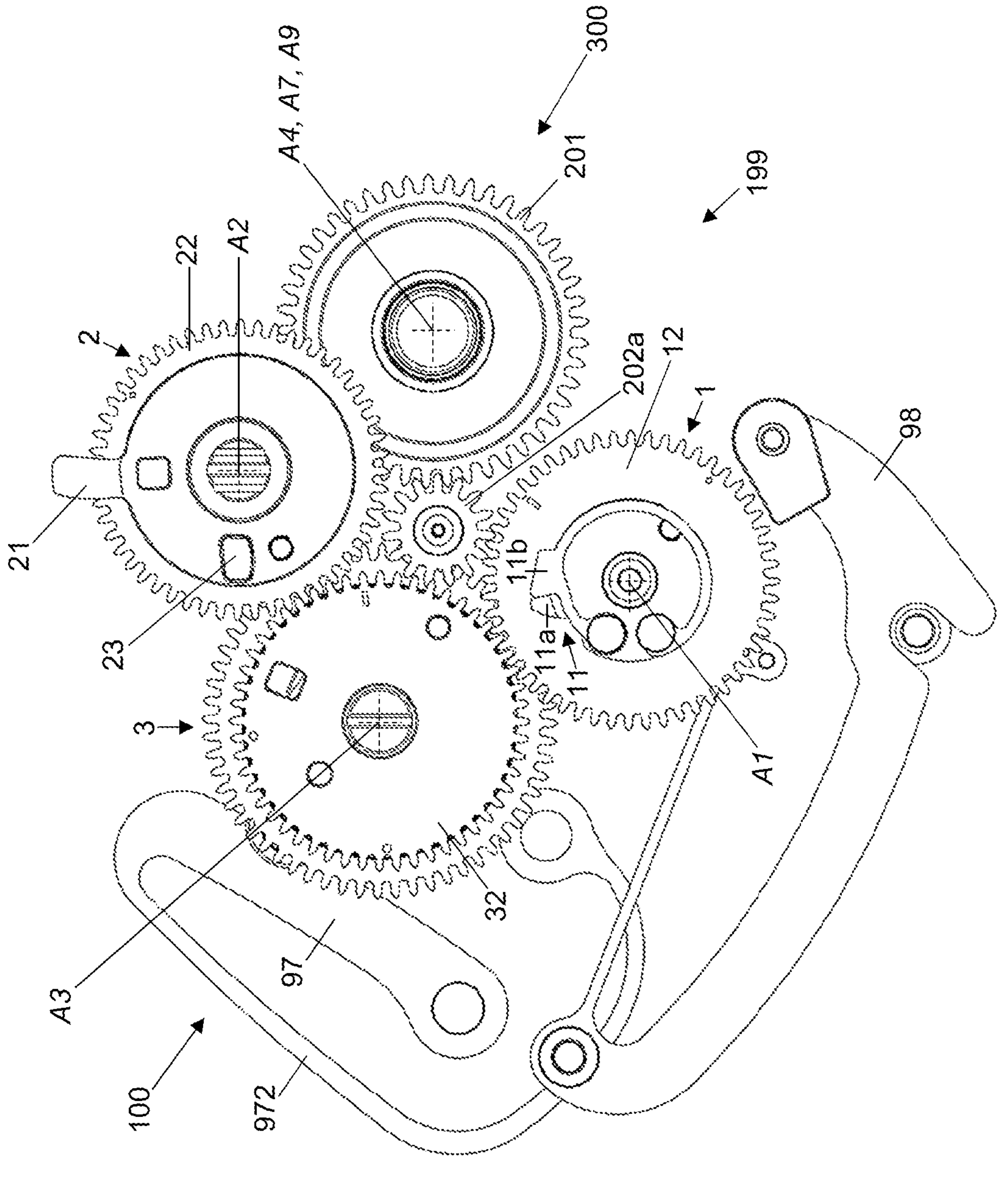
FIGS. 3 and 4 are a top and a bottom view, respectively, of a drive device for driving a calendar-displaying mobile.
Figure 4:
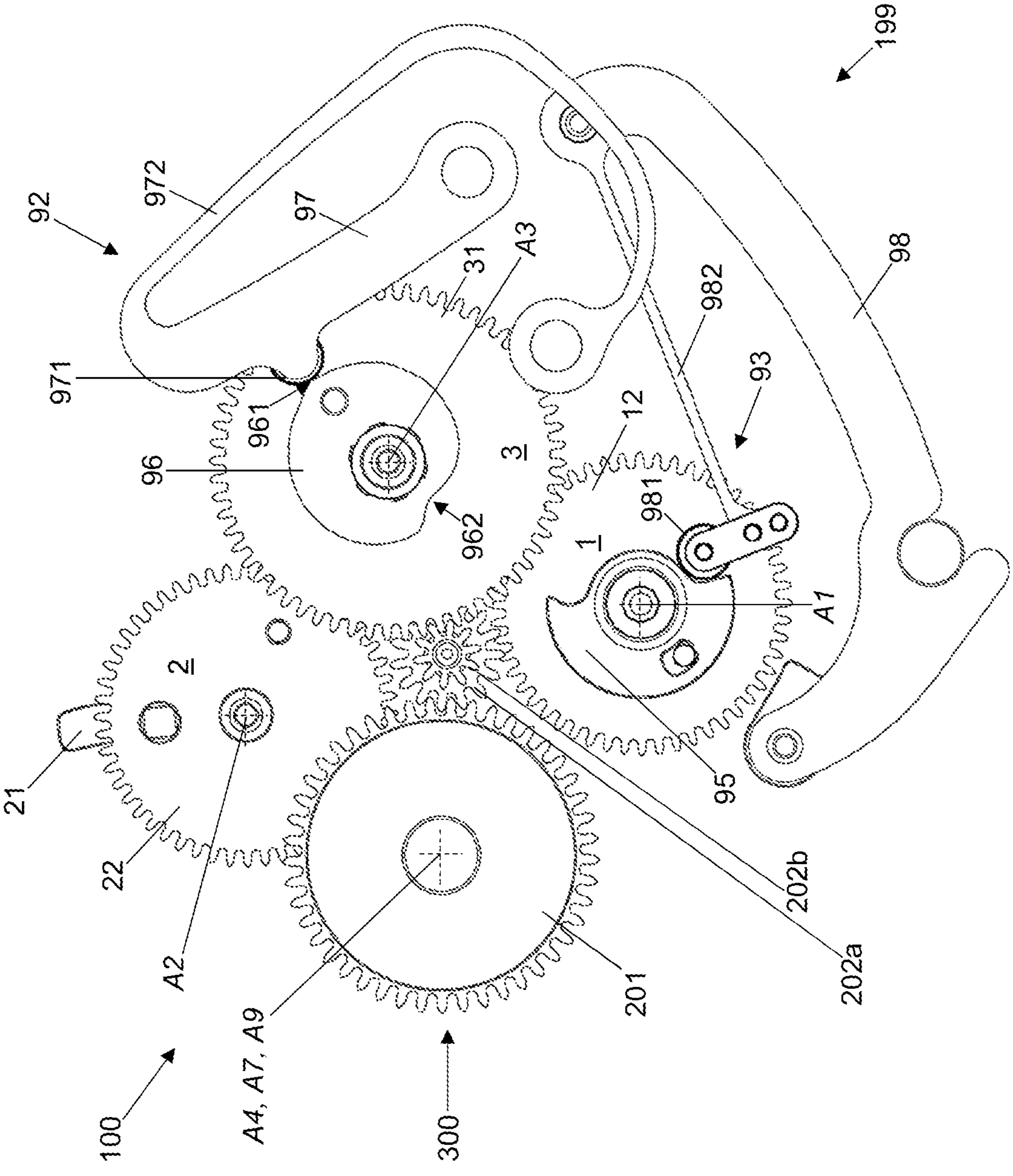
Figure 5:
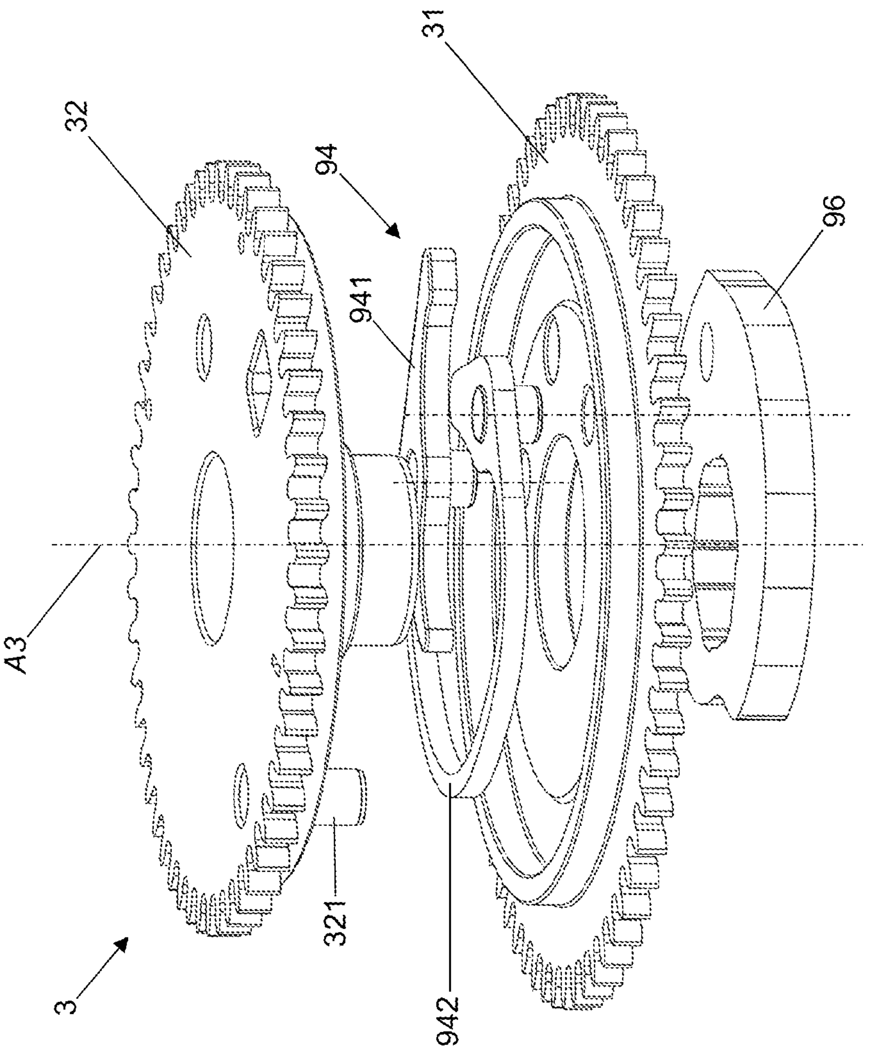
FIG. 5 is an exploded view of a drive mobile.

FIGS. 3 and 4 illustrate a top and a bottom view, respectively, of the drive device 100. The drive device 100 is connected to the geartrain of the movement 300 via an hour wheel 201.

The drive device 100 comprises a drive mobile 1 which is pivoted about an axis A1 and is provided with a drive finger 11 which is secured to a wheel 12 for conjoint rotation therewith. The drive finger 11 is configured and/or arranged so as to drive the mobile 4 every 24 hours by interacting, by making contact, with one of the teeth of the toothset 41. The drive finger 11 is likewise configured to stop the mobile 4 after having driven said mobile 4. The drive is advantageously of instantaneous type.

More particularly, the drive finger 11 comprises a first, rigid part 11*a* and a second, elastic part 11*b*. Such a configuration of the driver finger advantageously makes it possible to rapidly correct the days of the month when the finger 11 is located between two teeth of the toothset 41, notably after a jump in date, as is taught by document EP3483663.

The drive finger 11 is in this case oriented outwards. In other words, the drive finger 11 extends radially relative to the axis A1 in the direction away from said axis A1, in particular until it reaches a circle of radius RT1 (for Rayon de Tete [Head Radius]) that is centred on the axis A1, as illustrated in FIG. 6. Moreover, the axis A1 is in this case disposed on a circle of radius R1, which is centred on the axis A4.

The drive device 100 likewise comprises a drive mobile 2 which is pivoted about an axis A2 and is provided with the drive finger 21. This finger 21 is secured to a wheel 22 for conjoint rotation therewith. The drive finger 21 is provided to drive the mobile 4 by interacting, by making contact, with the tooth 51 of the finger 5, notably when the follower 6 prevents the finger 5 or the tooth 51 from moving about the axis A5. This drive takes place at the end of each month having thirty days or fewer. The drive mobile 2 is likewise provided with a drive finger 23 secured to the wheel 22 for conjoint rotation therewith. The drive finger 23 is provided to drive the starwheel 9 by interacting, by making contact, with one of the teeth of the toothset 91.

The drive finger 21 is oriented outwards. In other words, the drive finger 21 extends radially relative to the axis A2 in the direction away from said axis A2, in particular until it reaches a circle of radius RT2 (for Rayon de Tête [Head Radius]) that is centred on the axis A2, as illustrated in FIG. 6. Moreover, the axis A2 is in this case disposed on a circle of radius R2, which is centred on the axis A4.

Advantageously, the radius RT2 is different from the radius RT1. More particularly, the radius RT2 is greater than the radius RT1, or even greater than 1.5×RT1, or even greater than 1.8×RT1. Also advantageously, the radius R2 is different from the radius R1. More particularly, the radius R2 is advantageously less than the radius R1, or even less than 0.9×RT1, or even less than 0.8×RT1.

Such a configuration of the drive mobile 2 has the advantage of ensuring that the interaction by contact between the finger 21 and the tooth 51 makes it possible to drive the mobile 4 through one or more angular steps of the mobile 4 when the tooth 51 is prevented from moving relative to the mobile 4, in particular prevented from rotating about the axis A5, whereas the configuration of the drive mobile 1 makes it possible to drive the mobile 4 through a single and unique angular step of the mobile 4.

Advantageously, such configurations of the drive mobiles 1 and 2 interact with a mobile 4 comprising an inner toothset 41 provided with a head radius RT4 and with an inner tooth 51 provided with a head radius RT5, respectively, the head radius RT5 being less than the head radius RT4, or even less than 0.9×RT4, when the tooth 51 is prevented from moving relative to the mobile 4, in particular prevented from rotating about the axis A5.

The lead of the mobile 4 is thus optimized so as to enable it to perform, for a single action of the finger 21, up to several jumps or several angular steps. In particular, the drive mobile 2 and the mobile 4 are arranged and/or configured so as to enable several jumps or several angular steps of the mobile 4 for a single action of the finger 21. "A single action of the finger 21" is understood to mean a partial or complete rotation through a revolution of the finger 21 about the axis A2.

In this way, the drive finger 21 and the tooth 51 are arranged such that a single action of the drive finger 21 on the tooth 51 can displace the date mobile 4 through N steps, N being an integer such that N>1, notably N=2 or N=3.

The drive mobiles 1 and 2 are kinematically connected to one another via a drive mobile 3 of axis A3. More particularly, the wheels 12 and 22 are kinematically connected to one another via a wheel 32 of the third mobile 3, which is in this case interposed between the wheels 12 and 22. In the embodiment described, the axis A3 is disposed on a circle of radius R3, which is centred on the axis A4. Preferentially, the radius R3 is different from the radii R1 and R2. More particularly, the radius R3 is advantageously greater than the radii R1 and R2. Preferentially, R3>R1>R2.

The third mobile 3 likewise comprises a wheel 31 which is secured to the wheel 32 for conjoint rotation therewith in at least one direction of rotation, this making it possible to connect the hour wheel 201 to the third mobile 3 via two pinions 202*a*, 202*b* fixed to one another. More particularly, the wheel 201 drives the pinion 202*a*, and the pinion 202*b* drives the wheel 31, which in turn drives the wheel 32. The latter thus drives the wheels 12 and 22, in particular in the same direction of rotation.

The drive device 100, in particular the mobiles 1, 2 and 3, is thus connected to the geartrain of the movement 300 via the hour wheel 201. Advantageously, the mobiles 1 and 2 are disposed on either side of a plane passing through the axis A3 of the drive mobile 3 and through the axis of the movement (which notably coincides with the axis A4 of the date mobile).

Advantageously, the drive device 100 comprises an instantaneous drive device 92. The latter mainly comprises a calendar cam 96 and a lever-spring 97 pivoted on the frame 199. Preferentially, the mobile 3, more particularly visible in the exploded view of FIG. 5, comprises the calendar cam 96, which is provided to interact with the lever-spring 97, in particular with a roller 971 pivoted on the lever-spring 97. The cam 96 is notably secured to the wheel 32. The interaction of the cam 96 and the lever-spring 97 makes it possible to instantaneously drive the mobile 4 via the drive mobiles 1 and/or 2, in particular the fingers 11 and/or 21, through at least one angular step of the mobile 4. The interaction of the cam 96 and the lever-spring 97 likewise makes it possible to instantaneously drive the starwheel 9 via the drive mobile 2, in particular the finger 23, through one angular step of the starwheel 9.

Advantageously, the drive device 100 comprises a unidirectional connection device 94. Preferentially, the third mobile 3 comprises the unidirectional connection device 94, this making it possible to rotationally connect the wheels 31 and 32 in a single and same direction of rotation. This device comprises a pawl 941 pivoted on the wheel 31, which is returned elastically by a spring 942 and which is able to interact, by making contact, with a pin or a peg 321 of the wheel 32. The implementation of such a connection device notably allows a correction of the calendar system 200 at any time, irrespective of previous manipulations of the calendar system 200 or of the movement 300.

Throughout a day, the drive device 100 accumulates elastic potential energy by virtue of the winding of the spring 972 of the lever-spring 97, under the effect of the rotation of the cam 96, causing the spring 972 to deform, the cam 96 itself being driven by the movement 300 via the hour wheel 201. Once the roller 971 has arrived at the peak 961 of the cam 96 (as shown in FIG. 4), the spring 972 passes on the accumulated energy and the lever-spring 97 thus becomes a driver. The latter drives the cam 96 over a given angular range until the roller 971 is positioned in a recess 962 of the cam 96, this notably being made possible by the unidirectional connection 94. During this phase, specifically when the cam 96 is being displaced under the effect of the lever 97, the drive mobile 1, in a kinematic connection with the cam 96, instantaneously drives the mobile 4 through an angular step via the interaction of the finger 11 and a tooth of the toothset 41. During this same phase, the drive mobile 2, likewise in a kinematic connection with the cam 96, instantaneously drives the mobile 4 through at least one additional angular step via the interaction of the finger 21 and the tooth 51 when the latter is prevented from moving relative to the mobile 4, in particular when the latter is prevented from moving about the axis A5 under the effect of the activation system 6, 7.

The configuration of the drive device 100 thus makes it possible, for a given displacement of the cam 96 under the effect of the lever 97, to drive the mobile 4 through one angular step, two angular steps, three angular steps, or four angular steps of the mobile 4. This is made possible by the fact that the drive device 100 comprises two separate drive mobiles 1, 2 which are pivoted about two separate axes A1 and A2, the respective displacements of the fingers 11 and 21 taking place at the same time and their respective contact with one of the teeth of the toothset 41 and the tooth 51 taking place in succession. Advantageously, the axes A1, A2 are disposed on circles having separate radii R1, R2. Also advantageously, the finger 21 has a head radius RT2 different from the head radius RT1 of the finger 11. In particular, the head radius RT2 is greater than the head radius RT1. Configured in this way, the drive mobile 2, in particular the finger 21, is able to drive the mobile 4 through N steps, N being an integer such that N>1, notably N=2 or N=3.

The fingers 11 and 21 preferentially revolve at the same speed. Therefore, the toothsets of the wheels 12 and 22, 32 may notably comprise the same number of teeth and extend at one and the same level or in one and the same plane.

Advantageously, the drive device 100 comprises a device 93 for deactivating the jumper 98. This device 93 comprises a jumper cam 95 which is provided to interact with the jumper 98, in particular with a roller 981 that is pivoted on a part 982 forming a spring of the jumper 98. Such a device advantageously makes it possible to reduce, or even eliminate, the torque for indexing the mobile 4 or for holding it in position that is generated by the jumper 98 when the finger 11 drives one of the teeth of the toothset 41 and/or when the finger 21 drives the tooth 51, notably when the cam 96 is driven under the effect of the lever-spring 97, in particular under the effect of the spring 972 passing on the accumulated energy.

The drive mobile 1 preferentially comprises the cam 95 provided to interact with the jumper 98.

Therefore, the drive mobile 1 preferably comprises the jumper cam 95 of a jumper deactivation device 93, in addition to the first finger 11 and the wheel 12. Therefore, the drive mobile 2 preferably comprises a third drive finger 23, in addition to the second finger 21 and the wheel 22. Therefore, the drive mobile 3 preferably comprises the calendar cam 96 of an instantaneous drive device 92, and a unidirectional connection device 94, in addition to the wheels 31 and 32. However, any other disposition of the various elements 23, 95, 96 on the various drive mobiles could be envisaged.

Such a configuration of the drive mobiles 1, 2 and 3 makes it possible to distribute the various elements involved in the drive device 100 and/or the instantaneous drive device 92 and/or the unidirectional connection device 94 and/or the jumper deactivation device 93, and to make said elements coexist, in the best possible way. This notably has the advantage of achieving the implementation of a particularly thin drive device 100 and a fortiori a particularly thin calendar system 200.

One embodiment of a method for operating an embodiment of a calendar system 200 will now be described in multiple situations:

- at the end of a month having 28 days (February),
- at the end of a month having 31 days (March), and
- at the end of a month having 30 days (April).

Operation at the End of a Month of February Having 28 Days

FIGS. 7 to 11 illustrate the operation of the calendar system when the date changes at the end of a month of February having 28 days. During this phase, the mobile 4 performs four jumps or moves through four angular steps. Advantageously, the mobile 4 is actuated under the effect of the passing on of the accumulated energy by the spring 972 of the lever 97, which drives the calendar cam 96 and the fingers 11, 21, until the roller 971 is positioned in the recess 962 of the cam 96.

Figure 7:
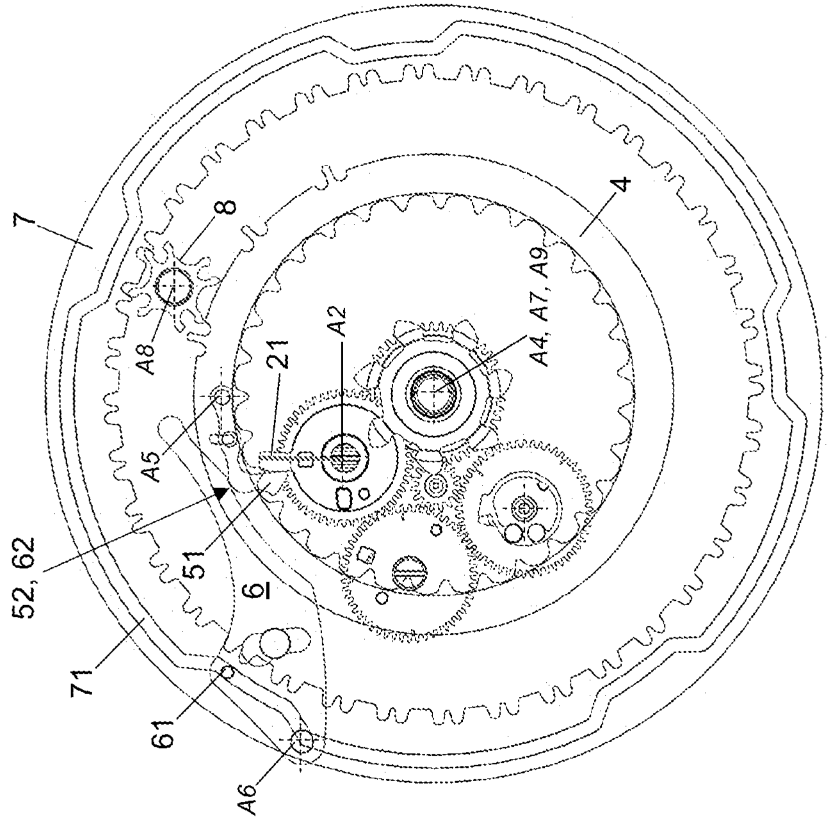

FIG. 7 illustrates the calendar system on 28 February at midnight, just before the mobile 4 jumps. In this configuration, the roller 971 starts to descend the calendar cam 96 from its peak 961, as illustrated in FIG. 4. The finger 21 then comes into contact with the tooth 51, whereas the finger 11 is out of range of the tooth 41.

The tooth 51 is in this case prevented from moving relative to the mobile 4, in particular prevented from moving about the axis A5, under the effect of the interaction of the respective surfaces 52 and 62 of the finger 5 and the follower 6. This is made possible by the interaction of the follower 6 and the cam 7, in particular by the interaction of the pin 61 and the groove 71, which positions the flank 62 of the follower 6 such that the tooth 51 cannot retract under the actuation of the finger 21. Therefore, when the activation system 6, 7 is in this configuration, the contact between the finger 21 and the tooth 51 causes the mobile 4 to rotate about the axis A4.

Figure 8:
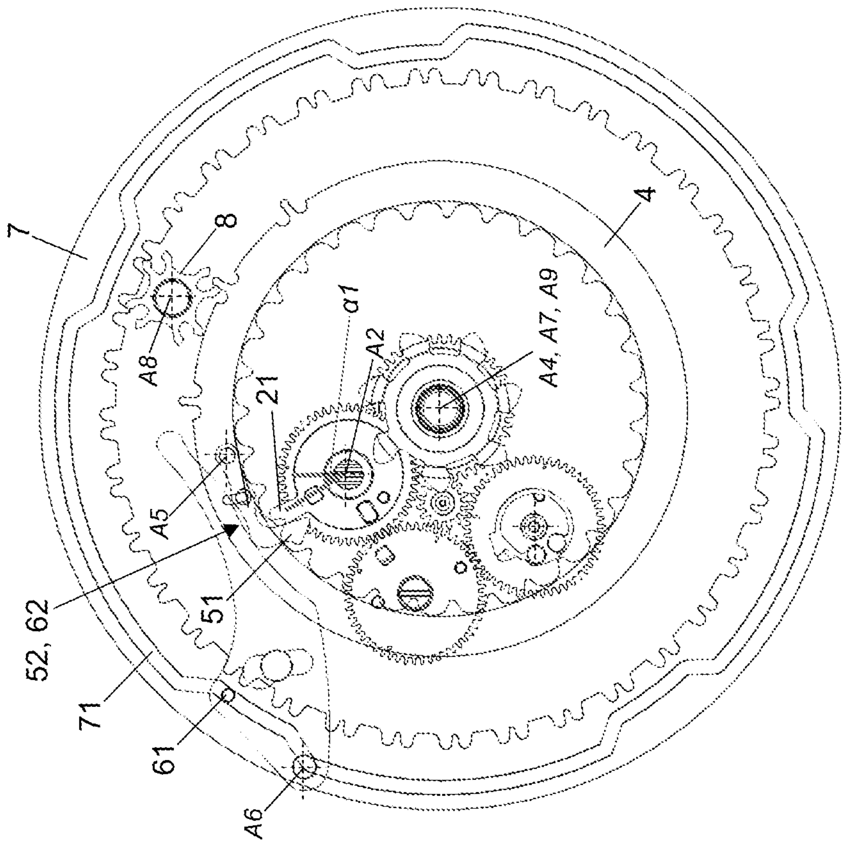
FIGS. 7 to 16 are illustrative views of the operation of the embodiment of the calendar system.

FIG. 8 illustrates the calendar system once the mobile 4 has been displaced through a first angular step about the axis A4, after having seen the finger 21 perform a rotation through a first angle $\alpha 1$ about the axis A2. Here, the finger 11 remains out of range of the toothset 41 despite the rotation it has already performed about the axis A1.

Figure 9:
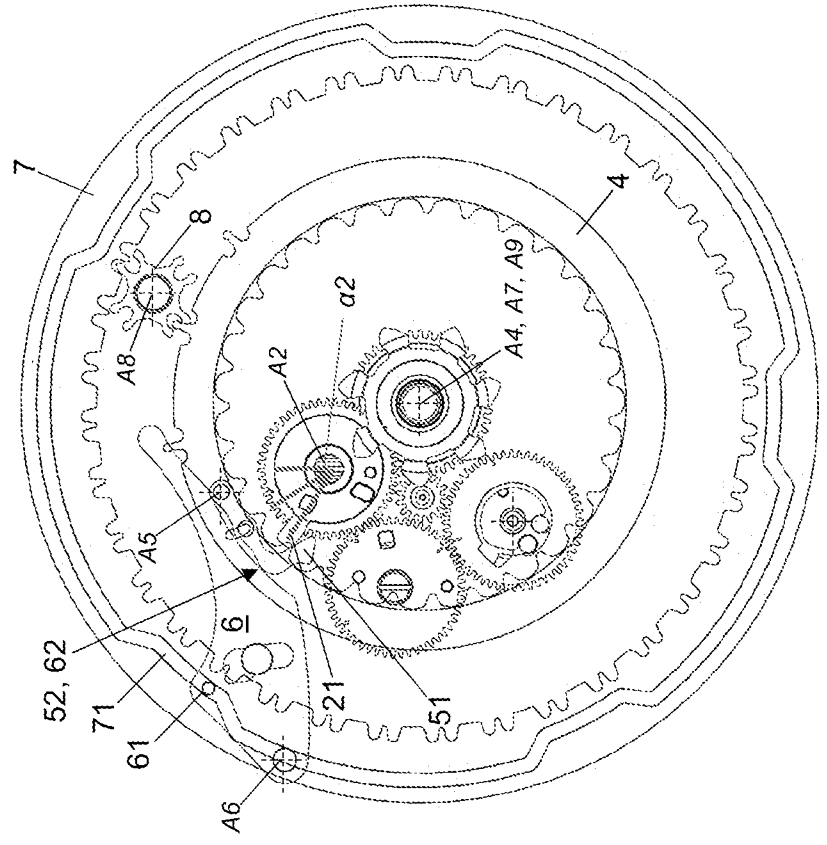
Figure 12:
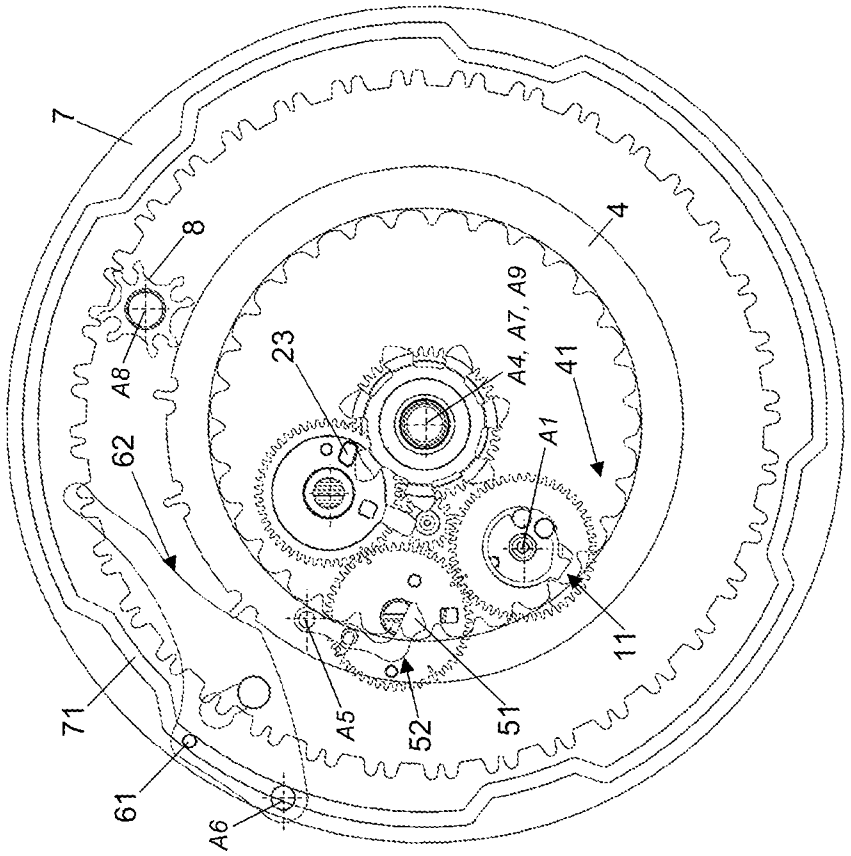

FIG. 9 illustrates the calendar system once the mobile 4 has been displaced through a second angular step about the axis A4, after having seen the finger 21 perform a rotation through a second angle $\alpha 2$ about the axis A2. Here, the finger 11 remains out of range of the toothset 41 despite the rotation it has already performed about the axis A1.

Figure 10:
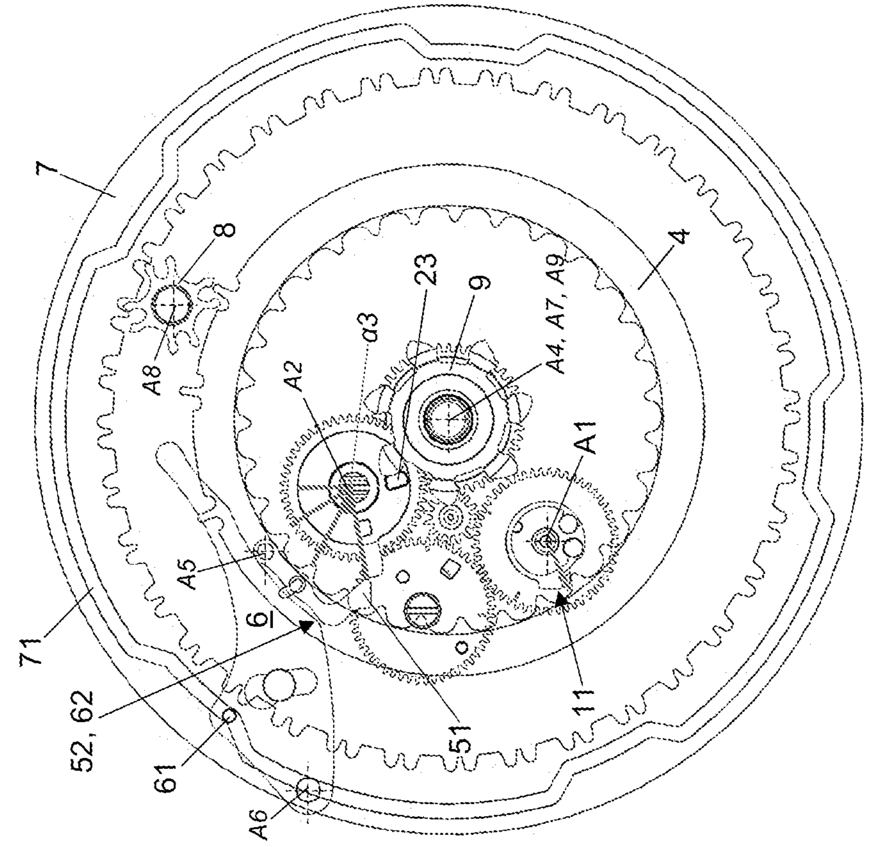

FIG. 10 illustrates the calendar system once the mobile 4 has been displaced through a third angular step about the axis A4, after having seen the finger 21 perform a rotation through a third angle $\alpha 3$ about the axis A2. In this configuration, the finger 21 comes out of contact with the tooth 51 and the finger 11 comes into contact with one of the teeth of the toothset 41.

Therefore, the finger 21 has been in contact with the tooth 51 through an angle $\vartheta=\alpha 1+\alpha 2+\alpha 3$ about the axis A2.

Figure 11:
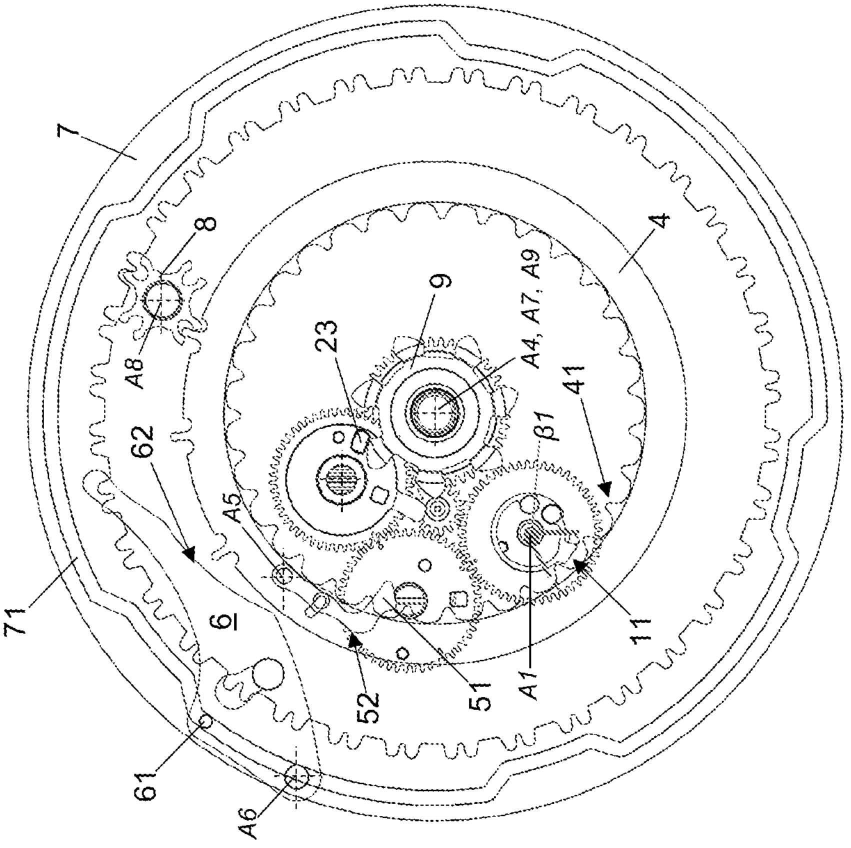

FIG. 11 illustrates the calendar system on the 1st March, once the mobile 4 has been displaced through a fourth angular step about the axis A4, after having seen the finger 11 perform a rotation through a first angle $\beta 1$ about the axis A1. More particularly, FIG. 11 illustrates the calendar system just after the date has changed, when the roller 971 is located in the recess 962 of the cam 96. In this configuration, the finger 11 is positioned between two teeth of the toothset 41, such that the finger 11 locks the mobile 4 and thus prevents any inadvertent additional jump of said mobile. Preferentially, $\beta 1 \geq \alpha 1$, $\alpha 2$, $\alpha 3$. Preferentially, $\beta 1 \leq \vartheta$.

Advantageously, the device 93 for deactivating the jumper 98 (not shown in FIGS. 7 to 11) is actuated, notably by the rotation of the drive mobile 1 about the axis A1. Such a device makes it possible to minimize, or even eliminate, the torque for indexing the mobile 4 or for holding it in position when the mobile 4 is actuated under the effect of the fingers 11 and/or the finger 21.

The indication of the days is driven when the finger 23 comes into contact with one of the teeth of the toothset 91 of the starwheel 9, thereby causing said starwheel to be driven. Once the jump in date has been performed (as shown in FIG. 11), the finger 23 is positioned between two teeth of the toothset 91 such that the finger 23 locks the starwheel 9 and thus prevents any inadvertent additional jump of said starwheel. For example, the finger 23 can come into contact with one of the teeth of the toothset 91 of the starwheel 9 at the time (or substantially at the time) at which the finger 11 comes into contact with one of the teeth of the toothset 41.

In this operating phase, the finger 21 has caused the mobile 4 to be displaced through three steps and the finger 11 has caused the mobile 4 to be displaced through one step. On the 28 February, just before midnight, the date mobile indicates "28" and on the 1st March, just after midnight, the date mobile indicates "1". The four drive steps of the mobile have allowed the following four successive changes:

- from the display of the date "28" to the display of the date "29", and then
- from the display of the date "29" to the display of the date "30", and then
- from the display of the date "30" to the display of the date "31", and then
- from the display of the date "31" to the display of the date "1", in the course of one instantaneous drive.

Operation at the End of the Month of March

Figure 14:
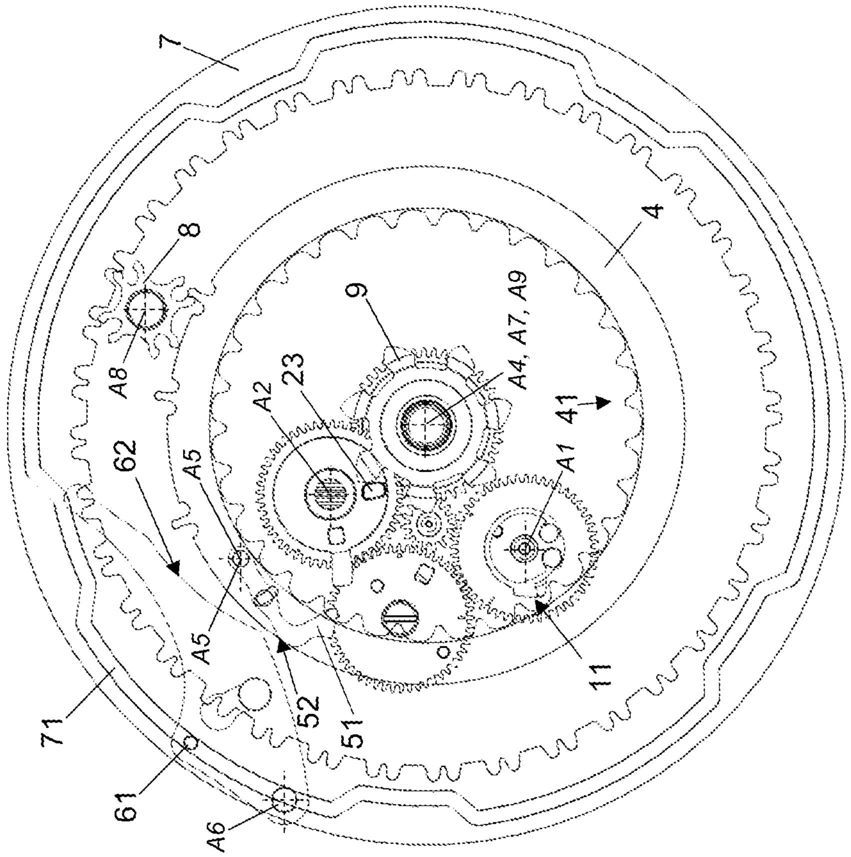
Figure 13:
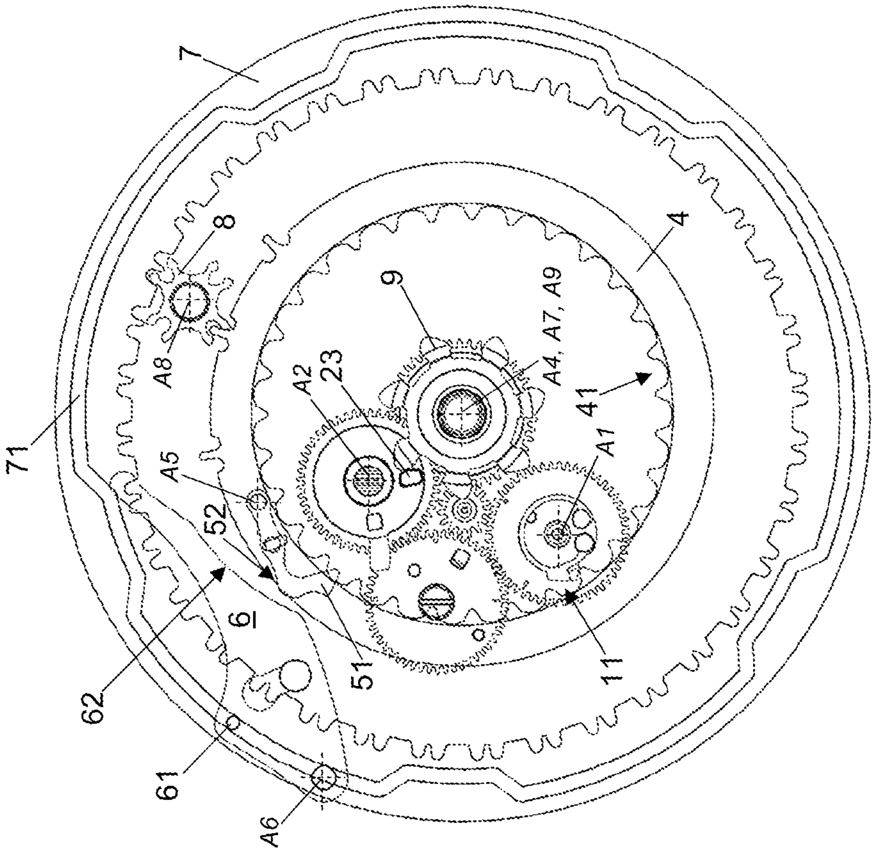

FIG. 13 illustrates the state of the calendar system on the 30 March at midnight, just before the mobile 4 jumps, and FIG. 14 illustrates the state of the calendar system on the 31 March at midnight, just before the mobile 4 jumps.

In FIG. 13, the follower 6 is in this case positioned by the cam 7, in particular by the pin 61 and the groove 71, such that the flank 62 of the follower is outside the range of the surface 52 of the finger 5. Therefore, the finger 5 can be moved about the axis A5, and the tooth 51 retracts under the actuation of the finger 21. Therefore, the finger 21 does not drive the rotation of the mobile 4 about the axis A4. The mobile 4 is lastly driven through a single and unique angular step about the axis A4 via the interaction of the finger 11 and a tooth of the toothset 41 through a first angle β1 about the axis A1. For its part, the starwheel 9 is driven through an angular step about the axis A9, under the actuation of the finger 23.

In FIG. 14, the follower 6 is in this case positioned by the cam 7, in particular by the pin 61 and the groove 71, such that the flank 62 of the follower is outside the range of the surface 52 of the finger 5. Therefore, the finger 5 can be moved about the axis A5, and the tooth 51 retracts under the actuation of the finger 21. Therefore, the finger 21 does not drive the rotation of the mobile 4 about the axis A4. The mobile 4 is lastly driven through a single and unique angular step about the axis A4 via the interaction of the finger 11 and a tooth of the toothset 41 through a first angle β1 about the axis A1. For its part, the starwheel 9 is driven through an angular step about the axis A9, under the actuation of the finger 23.

The same things are also done when the display changes from 28 March to 29 March and when the display changes from 29 March to 30 March.

Operation at the End of the Month of April

Figure 16:
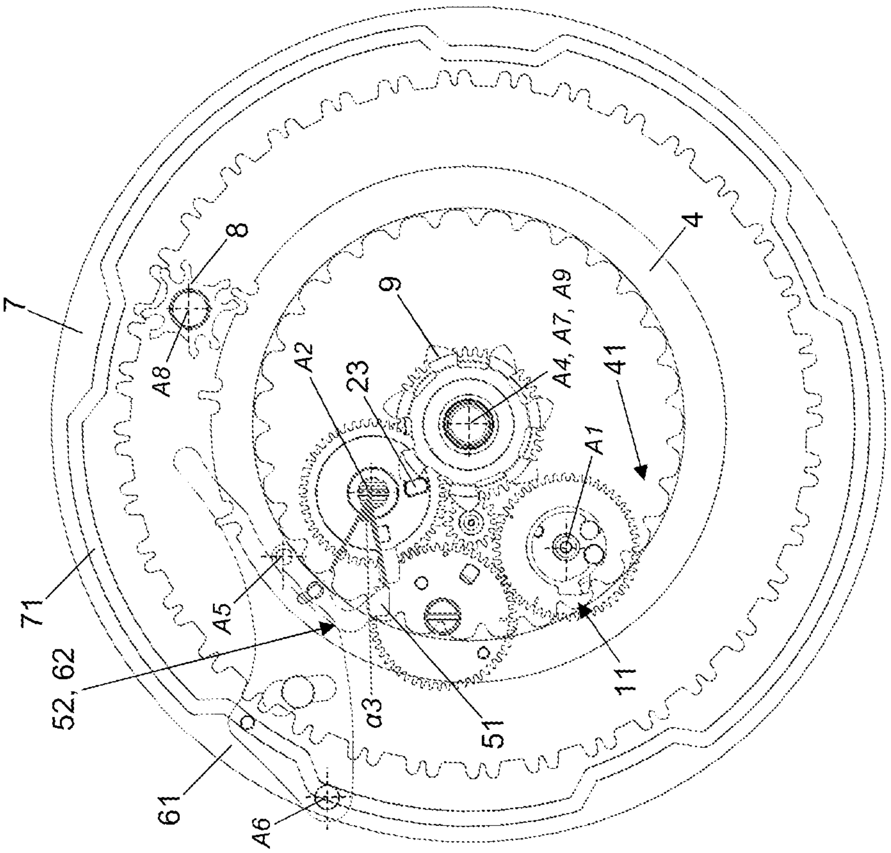
Figure 15:
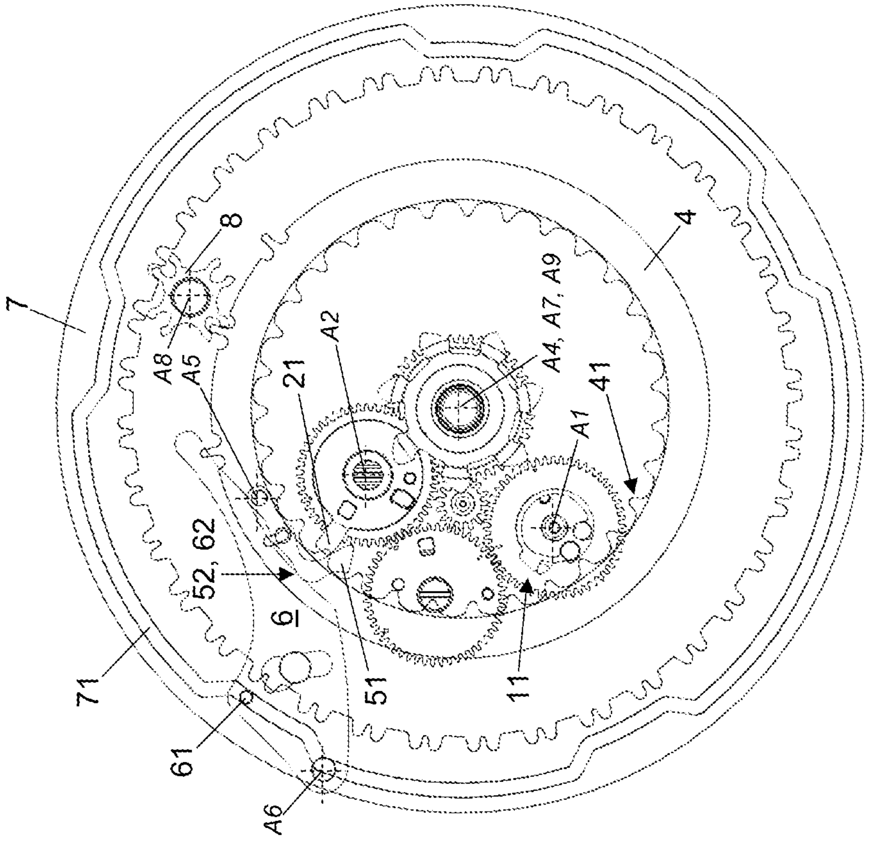

FIGS. 15 to 16 illustrate the operation of the calendar system when the date changes at the end of the month of April. During this phase, the mobile 4 performs two jumps or moves through two angular steps.

FIG. 15 illustrates the calendar system on 30 April at midnight. The follower 6 is in this case positioned by the cam 7, in particular by the pin 61 and the groove 71, such that the flank 62 of the follower 6 is in contact with the surface 52 of the finger 5. Therefore, when the finger 21 comes into contact with the tooth 51, this drives the rotation of the mobile 4 about the axis A4, even though the finger 11 is outside the range of the toothset 41.

FIG. 16 illustrates the calendar system once the mobile 4 has been displaced through a first angular step about the axis A4, after having seen the finger 21 perform a rotation through a third angle α3 about the axis A2. In this configuration, the finger 21 comes out of contact with the tooth 51 and the finger 11 comes into contact with one of the teeth of the toothset 41, such that it can in turn drive the mobile 4 through a second angular step about the axis A4. At this time, the starwheel 9 is likewise driven under the actuation of the finger 23.

In this operating phase, the finger 21 has caused the mobile 4 to be displaced through one step and the finger 11 has caused the mobile 4 to be displaced through one step. On the 30 April, just before midnight, the date mobile indicates "30" and on the 1st May, just after midnight, the date mobile indicates "1". The two drive steps of the mobile 4 have allowed the following two successive changes:

- from the display of the date "30" to the display of the date "31", and then
- from the display of the date "31" to the display of the date "1", in the course of one instantaneous drive.

On the 28 April at midnight, just before the mobile 4 jumps, the follower 6 is positioned by the cam 7, in particular by the pin 61 and the groove 71, such that the flank 62 of the follower is outside the range of the surface 52 of the finger 5. Therefore, the finger 5 can be moved about the axis A5, and the tooth 51 retracts under the actuation of the finger 21. Therefore, the finger 21 does not drive the rotation of the mobile 4 about the axis A4. The mobile 4 is lastly driven through a single and unique angular step about the axis A4 via the interaction of the finger 11 and a tooth of the toothset 41 through a first angle β1 about the axis A1. For its part, the starwheel 9 is driven through an angular step about the axis A9, under the actuation of the finger 23.

Similarly, on the 29 April at midnight, just before the mobile 4 jumps, the follower 6 is positioned by the cam 7, in particular by the pin 61 and the groove 71, such that the flank 62 of the follower is outside the range of the surface 52 of the finger 5. Therefore, the finger 5 can be moved about the axis A5, and the tooth 51 retracts under the actuation of the finger 21. Therefore, the finger 21 does not drive the rotation of the mobile 4 about the axis A4. The mobile 4 is lastly driven through a single and unique angular step about the axis A4 via the interaction of the finger 11 and a tooth of the toothset 41 through a first angle β1 about the axis A1. For its part, the starwheel 9 is driven through an angular step about the axis A9, under the actuation of the finger 23.

Therefore, it should be noted that the activation system 6, 7 is preferably arranged such that the single action of the first drive finger 21 on the first tooth 51 displaces the date mobile 4 through n steps, with n being an integer of any value between 1 and N, N being an integer such that N>1, notably N=2 or N=3, depending on the moment at which the first tooth 51 is activated by the activation system 6, 7.

Therefore, it should be noted that the activation system 6, 7 is preferably arranged such that at least a first position of the month cam 7 defines a first position of the follower 6 allowing the retraction of the first tooth 51, and that at least a second position of the month cam 7 defines a second position of the follower 6 preventing the retraction of the first tooth 51.

As seen above, the invention thus concerns a method for operating the timepiece calendar system or the timepiece movement or the timepiece, the method comprising the following steps:

- activating the first tooth 51,
- a single action of the first drive finger 21 on the first tooth 51 being able to displace the date mobile 4 through an amplitude of at most N steps, N being an integer such that N>1, notably N=2 or N=3.

Advantageously, the single action of the first drive finger 21 on the first tooth 51 displaces the date mobile 4 through n steps, with n being an integer of any value between 1 and N, depending on the moment at which the first tooth 51 is activated by the activation system 6, 7.

Therefore, the invention also concerns a method for operating the timepiece calendar system or the timepiece movement or the timepiece, the method comprising the following steps:

- activating the first tooth 51,
- a single action of the first drive finger 21 on the first tooth 51 causing the displacement of the date mobile 4 through n steps, with n being an integer of any value between 1 and N, N being an integer such that N>1, notably N=2 or N=3, depending on the moment at which the first tooth 51 is activated by the activation system 6, 7.

Irrespective of the method mentioned above, it should be noted that preferably, in accordance with what has been described above, when the first tooth 51 is activated (by controlling the activation system 6, 7), the first finger 21 subjects the first tooth 51 to a mechanical action for driving the date mobile 4.

As an alternative or in addition, irrespective of the method mentioned above, it should be noted that preferably, when the first tooth 51 is deactivated (by controlling the activation system 6, 7), the first finger 21 subjects the first tooth 51 to a mechanical action for retracting the first tooth 51 without driving the date mobile 4.

It is thus entirely possible to configure the activation system 6, 7 so as to implement an annual calendar system. In this scenario, the activation system controls the activation of the finger 51 each month just as for a month having 30 days or for a month having 31 days, without modifying the elements of the drive device. To that end, the cam 7, in particular the groove 71, could notably be modified.

The month cam 7 is driven in rotation about an axis A7 in the event of certain changes in date. To that end, the toothset 72 of the cam 7 is able to be driven periodically by the teeth of the toothset 42 of the mobile 4, via the pinion 8 interposed between the mobile 4 and the cam 7.

According to another aspect of the invention, the embodiment of the timepiece 400 or the timepiece movement 300 or the calendar system 200 comprises a movement transmission system 90 comprising:

- the driving mobile 4 which is pivoted about the first axis A4 and comprises the driving toothset 42 distributed over a curved profile 43, in particular a circular profile 43,
- the driven mobile 7 which is pivoted about a second axis A7 and comprises the driven toothset 72,
- the intermediate pinion 8 which is pivoted about the third axis A8 and comprises a toothset 81 driven by the driving toothset 42 and driving the driven toothset 72.

With preference, the curved profile 43 is centred on the axis A4 and at least partially defines the outer contour of the driving mobile 4.

The driving toothset 42, the curved profile 43, the driven toothset 72 and the toothset 81 are arranged at one and the same level or in one and the same plane.

The driving mobile 4, the driven mobile 7 and the intermediate pinion 8 are arranged such that the driving mobile 4 moves the driven mobile 7 via the intermediate pinion 8 through 1/m steps for at least some steps of the driving mobile 4, with m being a real number greater than 1 and preferably between 2 and 20.

The driving mobile 4, the driven mobile 7 and the intermediate pinion 8 are arranged such that the driving mobile 4 can define an angular position, with minimum play, of the driven mobile 7 via the pinion 8, whereas the driving mobile 4 is in a given angular position, in particular via the curved profile 43.

Figure 21:
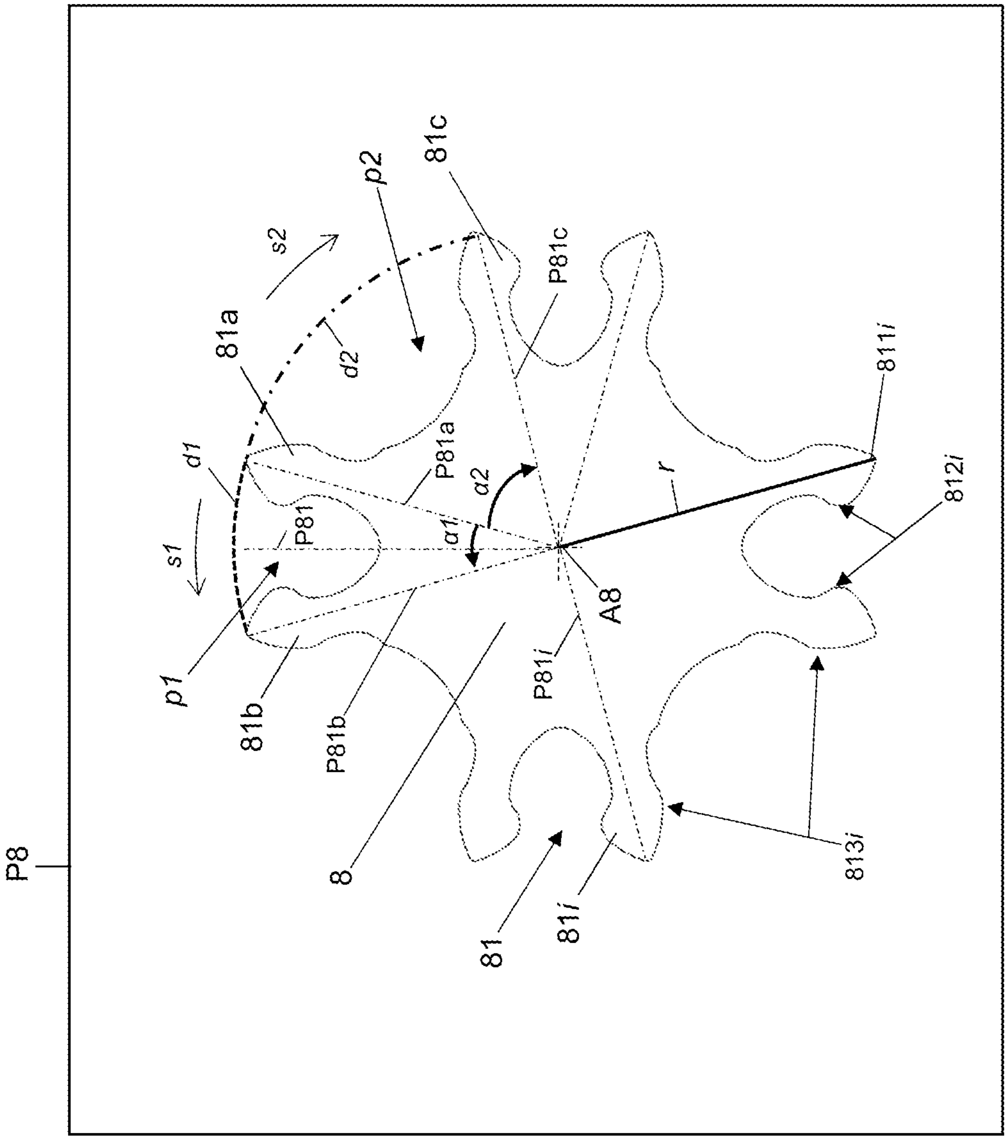
FIG. 21 is a view of a detail of the geometry of a pinion forming part of the movement transmission system.

As shown in FIG. 21, the pinion 8 is provided with a toothset 81 which has the particular feature on the one hand of extending at a single and unique level or in a single and unique plane P8, and on the other hand of comprising teeth 81*i* which are not distributed evenly relative to the axis A8 of said pinion.

More particularly, the toothset 81 has the particular feature of comprising separate first and second steps p1, p2.

The concept of a step p between two consecutive teeth can be likened here to the concept of a distance d between the teeth that is measured in a direction substantially orthoradial relative to the axis A8, independently of the number of teeth and/or the modulus of the teeth of the pinion. This distance could be measured at the head 811*i* of each of the teeth. Thus, more specifically, the distance d corresponds here to the length of an arc centred on the axis A8 that connects the heads 811*i* of two consecutive teeth.

As an alternative, the concept of a step p between two consecutive teeth can be likened here to the concept of an angle $\alpha$ formed by two planes P81*i* perpendicular to the plane P8, which respectively pass through two consecutive teeth, in the process passing through the axis A8 and through the respective head 811*i* of each of these teeth.

Of course, d and a are correlated, with $d \sim \alpha \times r$, in which r represents the radius of the head of the pinion, and $\alpha$ is expressed in radians.

Practically, as can be seen more particularly in FIG. 21, each tooth 81*i* may be made up of a tooth 81*a* disposed between two teeth 81*b* and 81*c*. More particularly, the teeth 81*b* and 81*c* are disposed on either side of the tooth 81*a*, in a first direction s1 and a second direction s2, respectively, as seen from the tooth 81*a*. The tooth 81*b* is disposed at a first distance d1 from the tooth 81*a*, whereas the tooth 81*c* is disposed at a second distance d2 from the tooth 81*a*. The first and second distances d1, d2 are different and the first and second directions s1, s2 are opposite directions.

By convention, $d2>d1$ in FIG. 21. Preferentially, $d2>1.5\times d1$, or even $d2>1.6\times d1$, or even $d2>1.7\times d1$.

Likewise by convention, the direction s1 corresponds to the anticlockwise direction and the direction s2 corresponds to the clockwise direction in this same FIG. 21. The angles $\alpha1$, $\alpha2$ may likewise constitute oriented angles, it being possible to consider $\alpha1$ as positive and $\alpha2$ as negative.

Thus, practically, the tooth 81*b* and the tooth 81*a* are separated by a first oriented angle $\alpha1$ about the axis A8, and the tooth 81*c* and the tooth 81*a* are separated by a second oriented angle $\alpha2$ about the axis A8, $\alpha1$ and $\alpha2$ being different and having opposite signs.

In FIG. 21, $|\alpha2|>|\alpha1|$. Preferentially, $|\alpha2|>1.5\times|\alpha1|$, or even $|\alpha2|>1.6\times|\alpha1|$, or even $|\alpha2|>1.7\times|\alpha1|$.

More generally, the tooth 81*b* adjoins the tooth 81*a* at a distance of a first step p1 in a first direction s1, and the tooth 81*c* adjoins the tooth 81*a* at a distance of a second step p2 in a second direction s2.

Thus, the toothset 81 comprises pairs of teeth. Two teeth of one and the same pair are separated by a distance of a first step p1 and two teeth of two separate pairs are separated by a distance of a second step p2.

Each tooth 81*i* preferentially has the same head radius r.

Advantageously, the teeth 81*i* are asymmetrical with respect to their plane P81*i*. Each tooth 81*i* thus comprises a first flank 812*i* and a second flank 813*i*, which are different. Such a tooth configuration makes it possible to optimize the geometries of each of the flanks with regard to their respective functions.

In particular, each tooth 81*i* of the toothset 81 comprises first flanks 812*i* which enable it on the one hand to be driven by the teeth 42*i* of the toothset 42 of the mobile 4, and on the other hand to drive, at least partially, the teeth of the toothset 72*i* of the cam 7. With preference, the teeth 42*i* are each surrounded by two cutouts 42*j*, 42*k* and distributed over the curved profile 43. Depending on the configuration of the cam 7, the first flanks 812*i* likewise make it possible to index the position of said cam 7, specifically angularly lock said cam 7 with minimum play. The first flanks 812*i* are notably configured to optimize the lead of the pinion 8 under the effect of the drive of the mobile 4. In particular, the geometry of the flanks 812*i* may be very particularly optimized with regard to this aspect.

The toothset 81 comprises second flanks 813*i* which make it possible on the one hand to drive the teeth 72*i* of the toothset 72 of the cam 7, and on the other hand to index the position thereof with regard to the mobile 4, specifically the angular locking thereof, with minimum play, with respect to the mobile 4, notably by interaction with the portions 43 of the mobile 4, in particular cylindrical portions 43 at least partially defining the outer periphery of the mobile 4.

With the toothset 81 of the pinion 8 configured in this way, the month cam 7 may furthermore have a toothset 72 comprising teeth 72*i* separated by slots 73*i*, the format of which results from the step p2 of the toothset 81. With preference, the teeth 72*i* are each surrounded by two second cutouts 72*j*, 72*k*.

The flanks 812*i* and 813*i* thus constitute drive means and/or locking means for the elements 4 and 7 that are disposed at the same level. Such a configuration of the toothset 81 thus makes it possible to propose a pinion formed at one and the same level, and therefore, a fortiori, to dispose the toothsets 42 and 72 at one and the same level. This notably has the advantage of achieving the implementation of a particularly thin calendar system 200. Furthermore, by virtue of the asymmetric character of the teeth 81*i*, the flanks 812*i* and 813*i* may be optimized with regard to their respective functions. In particular, the leads of the pinion 8 and/or of the cam 7 may be maximized whilst still preserving an adequate locking function, with minimum play, of the pinion 8 and/or of the cam 7, in particular by avoiding any risk of these elements butting against one another.

Furthermore, the driving mobile 4, the driven mobile 7 and the intermediate pinion 8 are arranged such that:

- the one or more teeth 42*i* of the driving toothset 42 interact exclusively with the internal flanks 812*i* of pairs of teeth of the pinion 8, and
- the external flanks 813*i* of pairs of teeth of the pinion 8 interact with the flanks of the second cutouts 72*j*, 72*k* of the driven toothset 72, and
- the curved profile 43 interacts exclusively with the external flanks 813*i*.

In the embodiment illustrated in the figures, the toothset 81 comprises eight teeth. From a visual perspective, the toothset 81 comprises four pairs of teeth, each of the pairs being separated by a step p2, and the teeth of each of the pairs being separated by a step p1. The teeth of each of the pairs are in this case symmetrical with respect to a plane P81 which is perpendicular to the plane P8 and passes through the axis A8. Furthermore, the toothset 81 exhibits order-4 rotational symmetry about the axis A8. In particular, the pairs of teeth 81*i* define an order-4 rotational symmetry about the axis A8. The flanks 812*i* are symmetrical to one another relative to the plane P81. Similarly, the flanks 813*i* are symmetrical to one another relative to the plane P81.

Figure 18:
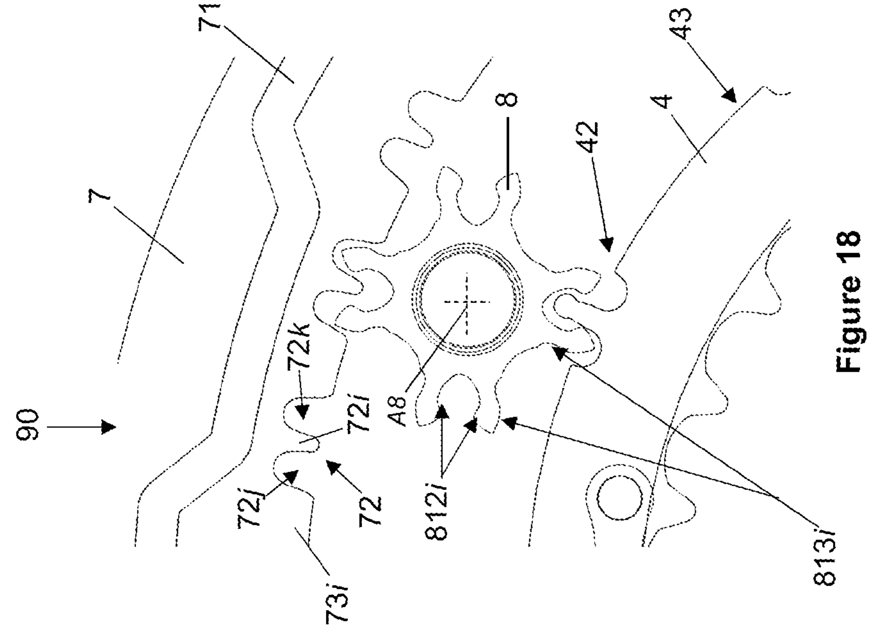
FIGS. 17 to 20 are illustrative views of the operation of a movement transmission system according to the invention.
Figure 17:
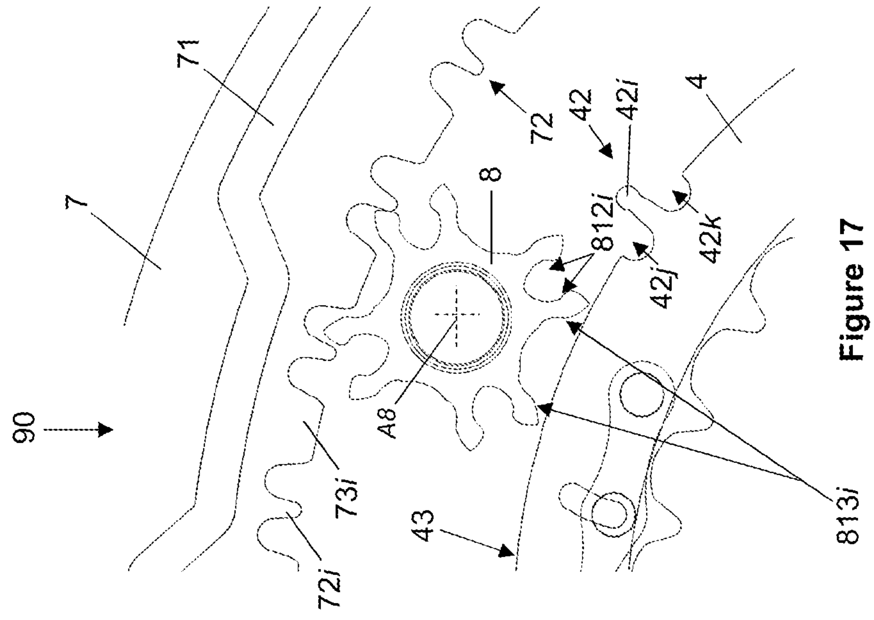

Such a pinion 8 makes it possible, for example, to drive the month cam 7 through seven angular steps of the date mobile 4, in the present instance from the 26th of a given month to the 2nd of the following month. FIGS. 17 and 18 are views of a detail which illustrate the elements 4, 7 and 8 of the calendar system on the 26th and 27th of a month of February, respectively. FIGS. 7 to 12 illustrate the states of the calendar system from the 28th of a month of February to the 2 March.

Actuating the month cam 7 before the 28th of a given month is particularly advantageous for the implementation of a semi-perpetual or perpetual calendar system. This is because such a sequence makes it possible to position the cam follower 6 so as to lock the tooth 51 relative to the date mobile 4 from the 28th of a month of February, or from the 29th of a month of February in the case of a leap year.

Figure 20:
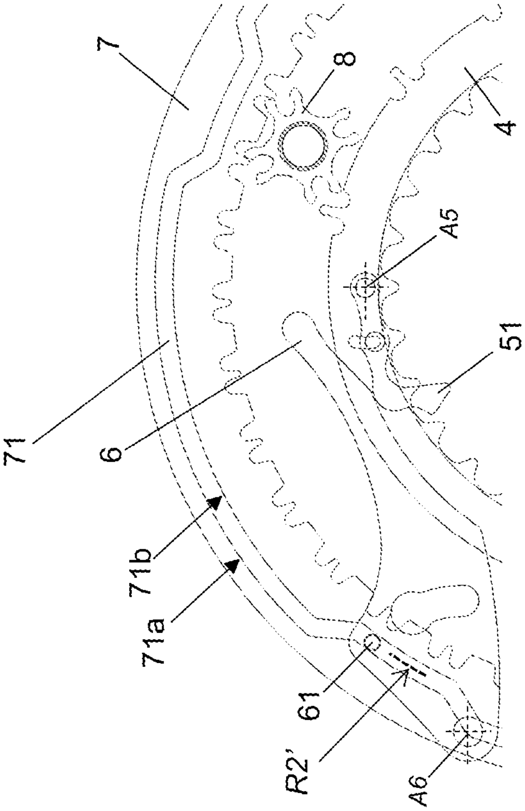
Figure 19:
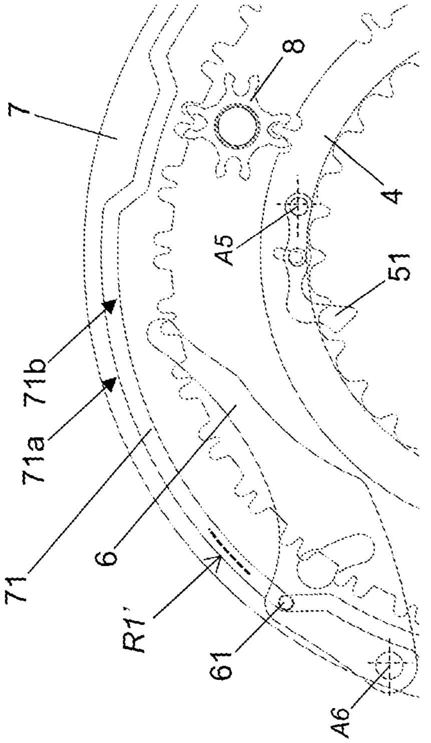

More particularly, within the context of a semi-perpetual calendar system, the month cam 7 is always actuated before the 28th of a given month. In the case of the embodiment of the calendar system illustrated in the figures, the month cam 7 is actuated when the date changes from the 26th to the 27th of a given month. FIGS. 19 and 20 illustrate the configuration of the cam 7 and the follower 6 on the 27th and 28th of a month of February, respectively. On the 27 February, the pin 61 of the follower 6 is in the groove 71 of the cam 7 at a first radius R1' centred on the axis A7, whereas, on the 28 February, this same pin is in the groove 71 of the cam 7 at a second radius R2' centred on the same axis, thereby positioning the follower 6 so as to lock the tooth 51 relative to the date mobile 4, and thus making it possible to displace the date mobile 4 through three additional steps under the effect of the finger 21, and therefore to change the date from the 28 February to the 1st March.

Therefore, at the end of a month of February in a non-leap year, the tooth 51 is activated on the 28 February so as to make it possible to displace the date mobile 4 through three additional steps under the effect of the finger 21, and therefore to change the date from the 28 February to the 1st March. At the end of a month having thirty days, the tooth 51 is activated on the 30th of the given month, so as to make it possible to displace the date mobile 4 through one additional step under the effect of the finger 21. Thus, the single action of the first drive finger 21 on the first tooth 51 displaces the date mobile 4 through one or more additional steps, depending on the moment at which the first tooth 51 is activated by the activation system 6, 7. In addition, in a perpetual calendar, at the end of a month of February in a leap year, the tooth 51 can be activated on the 29 February so as to make it possible to displace the date mobile 4 through two additional steps under the effect of the finger 21.

Depending on the configuration and arrangement of the toothsets 42, 81 and 72, the angular displacement performed by the month cam 7, under the effect of the displacement of the date mobile 4 through an angular step, may differ from one change in date to another. Notably, between the 26th of a given month and the 2nd of the following month, it can be conceivable not to drive the month cam in the event of a change in date. This is in particular the case of the embodiment of the calendar system illustrated in the figures, with a month cam 7 which is not displaced in the event of changing the date from the 28th to the 29th of a given month, as can be seen in FIGS. 7 and 8.

Preferentially, the month cam 7 likewise has the specific feature of being actuated after the first day of each month, preferably until the second day of each month, so as to appropriately position any display borne by the month cam facing apertures in the dial.

Of course, the number of teeth of the toothset 81 may vary. As an alternative to the embodiment described (comprising 4 pairs of teeth), the toothset 81 of the pinion 8 may for example comprise 10 teeth, in particular 5 pairs of teeth.

Furthermore, like the date mobile 4, which can be considered in general to be any mobile and not necessarily a disc, the cam 7 may also be considered more generally to be a mobile, so as to take account of the scenario in which the mobile 7 is more simply in the form of a month wheel.

In an alternative embodiment, it would furthermore be possible to imagine a date mobile 4 comprising an inner toothset 42 and a month mobile 7 comprising an outer toothset 72. The functions of the pinion 8 would then remain unchanged.

With preference:

- the driven mobile 7 is a month mobile, notably a month cam and/or a month-displaying mobile, or
- the driving mobile 4 is a date mobile.

Depending on the configurations of the transmission system:

- the driven mobile 7 surrounds the driving mobile 4, or
- the driving mobile 4 surrounds the driven mobile 7.

With preference, the driven mobile 7 is a month cam arranged so as to control the activation of the first tooth 51 for driving the driving mobile, constituting a date mobile 4, the first tooth 51 being mounted on the date mobile 4 so as to be displaceable between a deactivated, or retracted, position and an activated, or drive position.

According to the solutions described, the drive device 100 advantageously has the particular feature of comprising the kinematically connected first and second drive mobiles 1, 2, which are provided with a first finger and a second finger, respectively, which have respective axes, notably respective axes of rotation, that are separate and preferentially fixed relative to a frame. Moreover, this drive device has the particular feature of comprising, on the second mobile, the second finger which is provided to actuate a tooth mounted on a date mobile so as to be able to move, in order to enable at least one additional jump of the date mobile at the end of a month having thirty days or less.

Installing a tooth mounted mobile on a date so as to be able to move makes it possible to regulate the programming of an annual, semi-perpetual or perpetual cycle via a month-programming cam which is independent of the drive device, and thus makes it possible to considerably simplify the drive device whilst still giving it better performance and making it more compact.

Such a solution thus advantageously makes it possible to implement an instantaneous-jump drive device which is compatible with an annual, semi-perpetual or perpetual calendar system. Moreover, because of its compactness, this drive device likewise makes it possible to drive another calendar indication, such as the indication of days of the week.

Such a calendar system has the advantage of being able to be implemented independently of any return or indexing spring, via a positive-drive activation system, i.e. a desmodromic system, comprising a cam and a cam follower which regulate the programming of an annual, semi-perpetual or perpetual cycle.

The realization of the calendar system preferably has an instantaneous-jump drive device which is provided with two separate drive mobiles. Such a configuration of the drive device makes it possible to arrive at a particularly versatile definition of a calendar system, notably at an easy implementation of the annual or semi-perpetual calendar system without adding components or substantially modifying the components. Furthermore, such a configuration of the drive device makes it possible to reduce the energy losses at the oscillator, notably within the contact of the implementation of an instantaneous-jump semi-perpetual or perpetual calendar, as far as possible.

Throughout the present application, “step” is understood to mean the angular spacing separating two stable (or indexed) positions in the immediate vicinity of a mobile.

With the exception of the preceding paragraph, as concerns the driven mobile 7 or the month cam 7, “step” is understood to mean an angle of 30°, specifically an angle of 360°/12, 12 being the number of months in a year.

The invention claimed is:

1. A movement transmission system comprising:
   - a driving mobile which is pivoted about a first axis and comprises a driving toothset distributed over a curved profile,
   - a driven mobile which is pivoted about a second axis and comprises a driven toothset,
   - an intermediate pinion which is pivoted about a third axis and comprises a toothset driven by the driving toothset and driving the driven toothset,
   - a main plane of the driving toothset, a main plane of the curved profile, a main plane of the driven toothset and a main plane of the toothset being arranged at a same level or in a same plane,
   - the driving mobile, the driven mobile and the intermediate pinion being arranged so that the driving mobile moves the driven mobile via the intermediate pinion through 1/m steps for at least some steps of the driving mobile, wherein m is a real number greater than 1, and the driving mobile defines an angular position, with minimum play, of the driven mobile via a cooperation of the intermediate pinion with the curved profile, whereas the driving mobile is in a given angular position.

2. The movement transmission system according to claim 1, wherein the curved profile is centered on the first axis and at least partially defines the outer contour of the driving mobile.

3. The movement transmission system according to claim 2, wherein the intermediate pinion comprises asymmetric teeth.

4. The movement transmission system according to claim 2, wherein the intermediate pinion comprises four or five pairs of teeth.

5. The movement transmission system according to claim 1, wherein the intermediate pinion comprises asymmetric teeth.

6. The movement transmission system according to claim 1, wherein the intermediate pinion comprises four or five pairs of teeth.

7. The movement transmission system according to claim 6, wherein the teeth of one pair of teeth are configured symmetrically in relation to one another relative to a plane passing through the third axis of the intermediate pinion.

8. The movement transmission system according to claim 1, wherein the driving toothset comprises one or more teeth surrounded by two first cutouts and distributed over the curved profile.

9. The movement transmission system according to claim 1, wherein the driven toothset comprises teeth, each of which is surrounded by two second cutouts.

10. The movement transmission system according to claim 1,
    - wherein the driving toothset comprises one or more teeth surrounded by two first cutouts and distributed over the curved profile,
    - wherein the driven toothset comprises teeth, each of which is surrounded by two second cutouts, and
    - wherein the driving mobile, the driven mobile and the intermediate pinion are arranged so that:
      - the one or more teeth of the driving toothset interact exclusively with internal flanks of pairs of teeth of the pinion, and
      - external flanks of pairs of teeth of the pinion interact with flanks of second cutouts of the driven toothset, and
      - the curved profile interacts exclusively with the external flanks of the pairs of teeth of the pinion.

11. The movement transmission system according to claim 1, wherein:
    - the driven mobile surrounds the driving mobile, or
    - the driving mobile surrounds the driven mobile.

12. The movement transmission system according to claim 1, wherein:
    - the driven mobile is a month mobile, and/or
    - the driving mobile is a date mobile.

13. The movement transmission system according to claim 12, wherein the driving mobile, the driven mobile and the intermediate pinion are arranged so that the driven mobile is driven before the day of the month "28".

14. The movement transmission system according to claim 13, wherein the driving mobile, the driven mobile and the intermediate pinion are arranged so that the driven mobile is driven when the day of the month "26" is changing to the day of the month "27" and/or when the day of the month "27" is changing to the day of the month "28".

15. The movement transmission system according to claim 12, wherein the driven mobile is a month cam arranged so as to control the activation of a first tooth for driving the driving mobile, constituting a date mobile, the first tooth being mounted on the date mobile so as to be displaceable between a deactivated, or retracted, position and an activated, or drive position.

16. A timepiece calendar system comprising the movement transmission system according to claim 1.

17. A timepiece movement comprising the timepiece calendar system according to claim 16.

18. A timepiece comprising the movement transmission system according to claim 1.

19. The movement transmission system according to claim 1, wherein the driving toothset of the driving mobile is distributed over a circular profile.

20. The movement transmission system according to claim 1, wherein the driven mobile is a month cam and/or a month displaying mobile.

21. A movement transmission system comprising:

a driving mobile which is pivoted about a first axis and comprises a driving toothset distributed over a curved profile, a driven mobile which is pivoted about a second axis and comprises a driven toothset, an intermediate pinion which is pivoted about a third axis and comprises a toothset driven by the driving toothset and driving the driven toothset, the driving toothset, the curved profile, the driven toothset and the toothset being arranged at a same level or in a same plane, the driving mobile, the driven mobile and the intermediate pinion being arranged so that the driving mobile moves the driven mobile via the intermediate pinion through 1/m steps for at least some steps of the driving mobile, wherein m is a real number greater than 1, and so that the driving mobile can define an angular position, with minimum play, of the driven mobile via the pinion, whereas the driving mobile is in a given angular position, wherein the driven mobile is a month mobile and the driving mobile is a date mobile, and wherein the driven mobile is arranged so as to control the activation of a first tooth for driving the driving mobile, the first tooth being mounted on the date mobile so as to be displaceable between a deactivated, or retracted, position and an activated, or drive position.

* * * * *